US012786549B2

(12) United States Patent
Chun et al.

(10) Patent No.: US 12,786,549 B2
(45) **Date of Patent: *Nov. 3, 2026**

(54) MOBILE TERMINAL AND METHOD OF PERFORMING MULTI-FOCUSING AND PHOTOGRAPHING IMAGE INCLUDING PLURALITY OF OBJECTS USING THE SAME

(71) Applicant: Telefonaktiebolaget LM Ericsson (publ), Stockholm (SE)

(72) Inventors: Woo Chang Chun, Seoul (KR); Jin Sang Yun, Seoul (KR); Ja Won Koo, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/097,556

(22) Filed: Apr. 1, 2025

(65) Prior Publication Data

US 2025/0234084 A1 Jul. 17, 2025

Related U.S. Application Data

(63) Continuation of application No. 18/105,974, filed on Feb. 6, 2023, now abandoned, which is a continuation (Continued)

(30) Foreign Application Priority Data

Sep. 5, 2008 (KR) ........................ 10-2008-0087800
Oct. 11, 2010 (KR) ........................ 10-2010-0098558

(51) Int. Cl.

| | |
|---|---|
| *H04N 23/62* | (2023.01) |
| *G06F 3/0484* | (2022.01) |
| *G06F 3/04883* | (2022.01) |
| *H04N 23/611* | (2023.01) |
| *H04N 23/63* | (2023.01) |
| *H04N 23/67* | (2023.01) |
| *H04N 23/80* | (2023.01) |

(52) U.S. Cl.

CPC ........... *H04N 23/62* (2023.01); *G06F 3/0484* (2013.01); *G06F 3/04883* (2013.01); *H04N 23/611* (2023.01); *H04N 23/632* (2023.01); *H04N 23/635* (2023.01); *H04N 23/676* (2023.01); *H04N 23/80* (2023.01)

(58) Field of Classification Search

CPC .... H04N 23/62; H04N 23/611; H04N 23/632; H04N 23/635; H04N 23/676; H04N 23/80; G06F 3/0484; G06F 3/04883

USPC ..................................................... 348/333.11

See application file for complete search history.

(56) References Cited

U.S. PATENT DOCUMENTS 6,919,927 B1 * 7/2005 Hyodo ................. H04N 23/675 348/E5.042
7,034,881 B1 * 4/2006 Hyodo ................. H04N 23/631 348/333.12

(Continued)

*Primary Examiner* — Usman A Khan
(74) *Attorney, Agent, or Firm* — Sage Patent Group

(57) ABSTRACT

The present invention provides a mobile terminal and a method of capturing an image using the same. The mobile terminal controls a camera conveniently and efficiently to capture an image and performs focusing in various manners to capture an image. Accordingly, a user can obtain a desired image easily and conveniently.

20 Claims, 30 Drawing Sheets

Related U.S. Application Data of application No. 17/677,545, filed on Feb. 22, 2022, now Pat. No. 11,601,585, which is a continuation of application No. 16/357,123, filed on Mar. 18, 2019, now Pat. No. 11,290,636, which is a continuation of application No. 15/888,981, filed on Feb. 5, 2018, now Pat. No. 10,827,115, which is a continuation of application No. 14/561,090, filed on Dec. 4, 2014, now Pat. No. 9,888,168, which is a continuation of application No. 13/174,549, filed on Jun. 30, 2011, now Pat. No. 8,913,176, which is a continuation-in-part of application No. 12/351,591, filed on Jan. 9, 2009, now Pat. No. 8,416,306.

(56) References Cited

U.S. PATENT DOCUMENTS

| | | | | | |
|---|---|---|---|---|---|
| 8,392,849 | B2 * | 3/2013 | Jung | G06F 3/0486 | 715/810 |
| 10,203,837 | B2 * | 2/2019 | Xu | G06F 3/04815 | |
| 2002/0063696 | A1 * | 5/2002 | Kubo | G06F 3/0488 | 345/173 |
| 2003/0160886 | A1 * | 8/2003 | Misawa | H04N 23/45 | 348/240.1 |
| 2006/0097991 | A1 * | 5/2006 | Hotelling | G06F 3/04164 | 345/173 |
| 2006/0104523 | A1 * | 5/2006 | Suzuki | H04N 23/673 | 382/232 |
| 2006/0197845 | A1 * | 9/2006 | Masaki | G06T 7/20 | 348/E5.042 |
| 2007/0018069 | A1 * | 1/2007 | Higashino | H04N 23/635 | 250/200 |
| 2009/0015703 | A1 * | 1/2009 | Kim | H04N 23/631 | 348/333.12 |
| 2010/0020222 | A1 * | 1/2010 | Jones | H04N 5/772 | 348/E5.022 |
| 2010/0062803 | A1 * | 3/2010 | Yun | H04N 23/62 | 455/556.1 |
| 2010/0141826 | A1 * | 6/2010 | Thorn | H04N 23/631 | 348/E5.042 |
| 2010/0171863 | A1 * | 7/2010 | Kim | H04N 23/62 | 348/E5.022 |
| 2010/0182264 | A1 * | 7/2010 | Hahn | G06F 1/1626 | 345/173 |
| 2010/0321536 | A1 * | 12/2010 | Lee | G06F 3/04886 | 348/240.99 |

* cited by examiner

MOBILE TERMINAL AND METHOD OF PERFORMING MULTI-FOCUSING AND PHOTOGRAPHING IMAGE INCLUDING PLURALITY OF OBJECTS USING THE SAME

CROSS-REFERENCE TO RELATED APPLICATIONS

This application is a continuation of U.S. application Ser. No. 18/105,974, filed Feb. 6, 2023, which is a continuation of U.S. application Ser. No. 17/677,545, filed Feb. 22, 2022, which is a continuation of U.S. application Ser. No. 16/357,123, filed Mar. 18, 2019 (now U.S. Pat. No. 11,290,636), which is a continuation of U.S. application Ser. No. 15/888,981, filed Feb. 5, 2018 (now U.S. Pat. No. 10,827,115), which is a continuation of U.S. application Ser. No. 14/561,090, filed Dec. 4, 2014 (now U.S. Pat. No. 9,888,168), which is a continuation of U.S. application Ser. No. 13/174,549, filed Jun. 30, 2011 (now U.S. Pat. No. 8,913,176), which claims the benefit of earlier filing date and right of priority to Korean Application No. 10-2010-0098558, filed Oct. 11, 2010, and which is a continuation-in-part of U.S. application Ser. No. 12/351,591, filed Jan. 9, 2009 (now U.S. Pat. No. 8,416,306), which claims the benefit of earlier filing date and right of priority to Korean Application No. 10-2008-0087800, filed on Sep. 5, 2008, the contents of which are all hereby incorporated by reference herein in their entirety.

BACKGROUND

Field

This document relates to photographing images, and more particularly, to a mobile terminal capable of controlling a camera efficiently and conveniently to capture an image and a method of photographing an image using the same.

Discussion of the Related Art

As the functionality of terminals, such as personal computers, notebooks, and mobile phones, is diversified, the terminals have been implemented as multimedia players capable of performing complex functions. For example, the complex functions performed by the terminals include capturing images and video, playing music or video files, providing games, and receiving broadcasts.

Terminals can be divided into mobile terminals and stationary terminals according to their motility. Mobile terminals can also be divided into handheld terminals and vehicle mount terminals depending on how they are carried while moving.

In order to support and increase the functionality of terminals, structural and/or software portions of the terminals have been continuously improved. In recent years, a touch screen has been adopted by a variety of terminals including mobile terminals. The touch screen tends to have a large screen and is used as an input and output device to meet various needs of a user to overcome physical limits, such as the size of the terminals. Further, efforts have been made to diversify the complex functions of the terminals as multimedia players according to the needs of users and to provide a user interface (UI) capable of performing these functions conveniently.

SUMMARY

An object of the present invention is to provide a mobile terminal capable of controlling a camera using a touch screen conveniently and efficiently to effectively photograph a desired image a method of photographing an image using the same.

In one aspect of the present invention, a mobile terminal comprises a camera; a touch screen; and a controller configured to display a preview image that includes at least one object and is captured through the camera on the touch screen, to display a first guide including a specific point on the preview image in a predetermined size when receiving touch input applied to the specific point, to determine a focusing area for focusing on an object corresponding to the specific point while varying the size of the displayed first guide, to perform focusing on the image based on the determined focusing area and to capture the focused image.

In another aspect of the present invention, a mobile terminal comprises a camera; a touch screen; and a controller configured to display a preview image captured through the camera on the touch screen, to display a guide including a specific point on the preview image when receiving touch input applied to the specific point, to perform focusing on the image based on the specific point and to adjust the position of a lens included in the camera to finely adjust the focusing when a predetermined touch trace is input.

In another aspect of the present invention, a mobile terminal comprises a camera; a touch screen; and a controller configured to display a preview image captured through the camera on the touch screen, to perform multi-focusing on plural points on the preview image when receiving touch input for designating the plural points and to capture the multi-focused image.

In another aspect of the present invention, a method of capturing an image in a mobile terminal equipped with a touch screen comprises the steps of displaying a preview image that includes at least one object and is captured through a camera on the touch screen; displaying a first guide including a specific point on the preview image in a predetermined size when touch input applied to the specific point is received; and determining a focusing area for focusing on an object corresponding to the specific point while varying the size of the displayed first guide, performing focusing on the image based on the determined focusing area and capturing the focused image.

In another aspect of the present invention, a method of capturing an image in a mobile terminal equipped with a touch screen comprises the steps of displaying a preview image captured through a camera on the touch screen; displaying a guide including a specific point on the preview image when touch input applied to the specific point is received and performing focusing on the image based on the specific point; and adjusting the position of a lens included in the camera to finely adjust the focusing when a predetermined touch trace is input.

In another aspect of the present invention, a method of capturing an image in a mobile terminal equipped with a touch screen comprises the steps of displaying a preview image captured through a camera on the touch screen; performing multi-focusing on plural points on the preview image when touch input for designating the plural points is received; and capturing the multi-focused image.

According to the mobile terminal and the method of photographing an image using the same according to the present invention, a user can control a camera conveniently and efficiently and perform focusing on an image in various manners and then capture the image.

Furthermore, in the use of a face recognition function, the user can scan only an intended area of a preview image without scanning the entire preview image to effectively detect a face from the preview image, and thus the quantity of resources used for the face recognition function can be remarkably reduced.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal related to the present invention will now be described in detail with reference to the accompanying drawings. It is to be noted that the suffixes of constituent elements used in the following description, such as "module" and "unit", are simply used by considering the easiness of writing this specification, but are not particularly given importance and roles. Accordingly, the terminologies "module" and "unit" can be uses interchangeably. Further, a mobile terminal described in this specification may include, for example, mobile phones, smart phones, notebooks computers, terminals for digital broadcast, personal digital assistants (PDA), portable multimedia players (PMP), and navigators.

Figure 1:
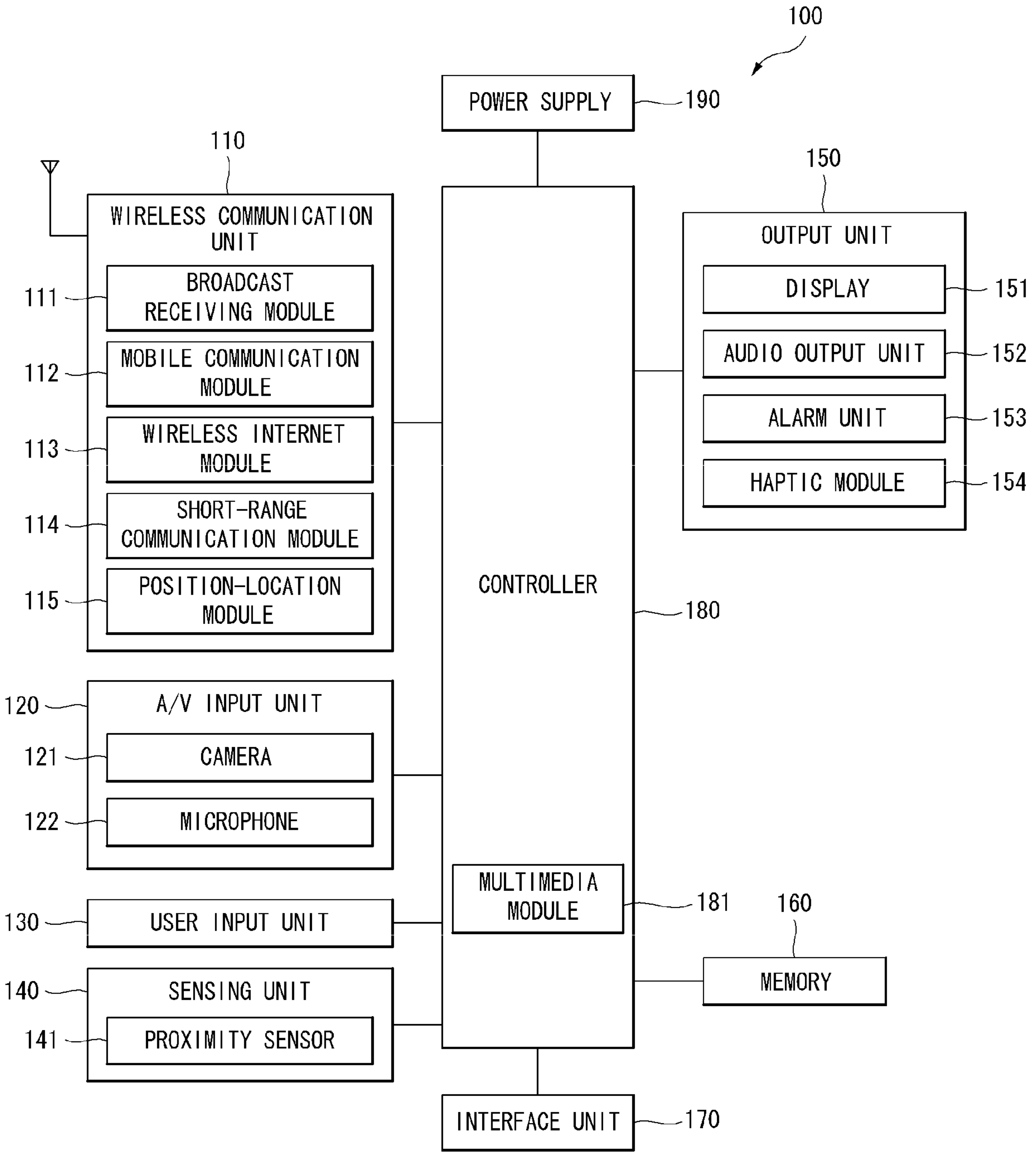
FIG. 1 is a block diagram of a mobile terminal according to an embodiment of the present invention.

FIG. 1 illustrates components of a mobile terminal according to an embodiment of the present invention. The mobile terminal 100 includes components such as a wireless communication unit 110, an audio/video (NV) input unit 120, a user input unit 130, a sensing unit 140, an output unit 150, memory 160, an interface unit 170, a controller 180, and a power supply 190. The components shown in FIG. 1 are not indispensable, but it is understood that a mobile terminal having greater or fewer components may alternatively be implemented.

The wireless communication unit 110 may include one or more modules, enabling wireless communications between the mobile terminal 100 and a wireless communication system or between the mobile terminal 100 and a network where the mobile terminal 100 is located. For example, the wireless communication unit 110 includes a broadcast receiving module 111, a mobile communication module 112, a wireless Internet module 113, a short-range communication module 114, and a position-location module 115.

The broadcast receiving module 111 receives broadcast signals and/or broadcast associated information from an external broadcast managing entity via a broadcast channel. The broadcast channel may include a satellite channel and a terrestrial channel. The broadcast managing entity refers generally to a system, which generates and transmits broadcast signals and/or broadcast associated information, or a system, which receives previously generated broadcast signals and/or broadcast associated information and provides them to a terminal. The broadcast signals may be implemented as TV broadcast signals, radio broadcast signals, and data broadcast signals, among others. If desired, the broadcast signals may further include broadcast signals combined with TV or radio broadcast signals.

The broadcast associated information refers to information associated with a broadcast channel, a broadcast program or a broadcast service provider. The broadcast associated information may also be provided via a mobile communication network and received by the mobile communication module 112.

The broadcast associated information may exist in various forms. For example, the broadcast associated information includes an electronic program guide (EPG) of digital multimedia broadcasting (DMB), or electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), media forward link only (MediaFLO®), digital video broadcast-handheld (DVB-H), and integrated services digital broadcast-terrestrial (ISDB-T). It is also to be understood that the broadcast receiving module 111 may be configured to be suitable for other broadcast systems, which provide broadcast signals, as well as the digital broadcast systems. The broadcast signal and/or broadcast associated information received via the broadcast receiving module 111 may be stored in the memory 160.

The mobile communication module 112 transmits/receives radio signals to/from a base station, an external terminal, and an entity over a mobile communication network. The radio signals may include various forms of data according to transmission/reception of voice call signals, video telephony call signals and text/multimedia messages.

The wireless Internet module 113 refers to a module for wireless Internet access. This module may be internally or externally coupled to the mobile terminal 100. For example, wireless Internet technologies include wireless LAN (WLAN) (Wi-Fi), wireless broadband (WiBro), world interoperability for microwave access (Wimax), and high-speed downlink packet access (HSDPA).

The short-range communication module 114 refers to a module for short-range communications. For example, suitable short-range communication technologies include BLUETOOTH, radio frequency identification (RFID), infrared data association (IrDA), ultra-wideband (UWB), and ZigBee.

The position-location module 115 is a module for identifying or otherwise obtaining the location of a mobile terminal 100. A representative one of examples of the position-location module 115 includes a global positioning system (GPS). According to the current technology, the GPS module 115 can calculate three-dimensional position information on the basis of latitude, longitude, and altitude with respect to one point (object) on a specific time by calculating information about the distance of the one point (object) from three or more satellites and information about the time where the distance information was measured and then applying trigonometry to the calculated distance information. A method of calculating position and time information using three satellites and modifying error of the calculated position and time information using another satellite is also used. The GPS module 115 also continues to calculate a current location in real-time and calculates velocity information based on the current location.

Further referring to FIG. 1, the A/V input unit 120 is configured to input audio or video signals. The A/V input unit 120 may include a camera 121, a microphone 122 and the like. The camera 121 receives and processes image frames of still pictures or video obtained by an image sensor in a video call mode or a photographing mode. The processed image frames may be displayed on the display 151.

The image frames processed in the camera 121 may be stored in the memory 160 or transmitted to the outside via the wireless communication unit 110. Two or more cameras 121 may be included according to the configuration aspect of a terminal.

The microphone 122 receives external sound signals in various modes, such as a phone call mode, a recording mode, and a voice recognition mode, and processes the sound signals into electrical voice data. The processed voice data can be converted into a form, which can be transmitted to a mobile communication base station through the mobile communication module 112, for example, in the phone call mode, and then output as a sound or voice via the output unit 150 such as an audio output unit 152. Various noise removing algorithms for removing noise occurring in the course of receiving external sound signals may be implemented in the microphone 122.

The user input unit 130 generates input data responsive to user manipulation of an associated terminal or terminals. Examples of the user input unit 130 include a keypad, a dome switch, a jog wheel, a jog switch, and a touchpad, such as static pressure/capacitance.

The sensing unit 140 senses a current status of the mobile terminal 100 and generates a sensing signal for controlling an operation of the mobile terminal 100. For example, the sensing unit 140 detects an open/close status of the mobile terminal 100, a position of the mobile terminal 100, a presence or absence of user contact with the mobile terminal 100, orientation of the mobile terminal 100, and acceleration/deceleration of the mobile terminal 100. For example, when the mobile terminal 100 is configured as a slide-type mobile terminal, the sensing unit 140 senses whether a sliding portion of the mobile terminal 100 is open or closed. Other examples include the sensing unit 140 sensing the presence or absence of power provided by the power supply 190, the presence or absence of a coupling or other connection between the interface unit 170 and an external device. The sensing unit 140 may further include a proximity sensor 141 which is described below in more detail.

The output unit 150 is configured to generate outputs associated with the sense of sight, the sense of hearing, tactile sense, and so on and may include a display 151, the audio output unit 152, an alarm unit 153, a haptic module 154 and the like.

The display 151 displays information processed in the mobile terminal 100. For example, when the mobile terminal 100 is in a phone call mode, the display 151 displays a user interface (UI) or a graphic user interface (GUI), which is associated with a phone call. When the mobile terminal 100 is in a video call mode or a photographing mode, the display 151 displays photographed and/or received images, UI or GUI.

The display 151 may be implemented using known display technologies including, for example, a liquid crystal display (LCD), a thin film transistor-liquid crystal display (TFT-LCD), an organic light-emitting diode display (OLED), an a flexible display and a three-dimensional display. Some of the displays 151 may be configured in a transparent type or a light-transmitting type, enabling the outside to be seen therethrough. This is called a transparent display. Representative examples of the transparent display include a transparent LCD. Some of the displays 151 may also be configured in a rear-side structure or light-transmitting type of the display 151. Such configurations enable a user to see objects located in the rear of a terminal body through an area occupied by the display 151 of the terminal body.

Two or more displays 151 may be present according to the configuration type of the mobile terminal 100. For example, a plurality of the displays 151 may be arranged with them being spaced apart from each other or integrally on one surface of the mobile terminal 100 and arranged on different surfaces of the mobile terminal 100.

When the display 151 and a touch sensor, which is a sensor for sensing a touch operation, constitute a mutually layered structure or a touch screen, the display 151 may also be used as an input device as well as an output device. The touch sensor may have a form such as a touch film, a touch sheet, and a touch pad.

The touch sensor may be configured to convert a change in the pressure applied to a specific portion of the display 151 or electrostatic capacitance occurring at a specific portion of the display 151 into an electrical input signal. The touch sensor may be configured to sense pressure at the time of touch as well as a touched position and area.

When a touch input is received by the touch sensor, a corresponding signal(s) is sent to a touch controller. The touch controller processes the signal(s) and transmits corresponding data to the controller 180. Thus, the controller 180 can determine which area of the display 151 has been touched.

The proximity sensor 141 may be positioned in an internal area of the mobile terminal 100, which is surrounded by the touch screen, or near the touch screen. The proximity sensor 141 refers to a sensor for sensing objects approaching a specific detection surface or whether objects exist nearby without a direct contact by employing electromagnetic force or infrared rays. The proximity sensor 141 has a longer lifespan than that of a contact type sensor and also has increased efficiency.

Examples of the proximity sensor 141 include a transmit type photoelectric sensor, a direct reflection type photoelectric sensor, a mirror reflection type photoelectric sensor, a high frequency oscillation type proximity sensor, an electrostatic capacitance type proximity sensor, a magnetic type proximity sensor, and an infrared proximity sensor.

When the touch screen is an electrostatic type, the touch screen is configured to sense the proximity of a pointer based on a change in electric field according to the proximity of the pointer. In this case, the touch screen (touch sensor) may be classified as a proximity sensor.

Hereinafter, for convenience of description, a behavior in which a pointer comes close to the touch screen without touching the touch screen and, therefore, the pointer is recognized as if it exists on the touch screen is referred to as a "proximity touch", and a behavior in which a pointer is actually touched on the touch screen is referred to as a "contact touch". A proximity touch position of the pointer on the touch screen refers to a position where the pointer vertically corresponds to the touch screen when the pointer becomes the proximity touch.

The proximity sensor 141 is configured to sense a proximity touch action and a proximity touch pattern, which includes, for example, a proximity touch distance, a proximity touch direction, a proximity touch speed, a proximity touch time, a proximity touch position, and a proximity touch moving status. Information corresponding to the sensed proximity touch operation and the proximity touch pattern may be output on a touch screen.

The audio output unit 152 may output audio data, which is received from the wireless communication unit 110 or stored in the memory 160, in various modes including a call-receiving mode, a call-placing mode, a recording mode, a voice recognition mode and a broadcast reception mode. The audio output unit 152 outputs audio relating to a particular function, for example, call received or message received, which is performed in the mobile terminal 100. The audio output unit 152 may be implemented using receivers, speakers, buzzers, and the like.

The alarm unit 153 outputs signals to inform the occurrence of events in the mobile terminal 100. For example, the events occurring in the mobile terminal 100 include signals, including call-received and message-received, a key entry signal, and a touch input. The alarm unit 153 may also output signals to inform the occurrence of events in different ways other than the audio or video signal, for example, through vibration. The video signal or the audio signal may also be output through the display 151 or the audio output unit 152.

The haptic module 154 generates a variety of haptic effects which can be felt by a user. One of representative examples of the haptic effects, which are generated by the haptic module 154, includes a vibration effect. The intensity and pattern of vibration generated by the haptic module 154 can be controlled. For example, different vibrations may be combined or output or sequentially output.

The haptic module 154 may generate various haptic effects, for example, an effect caused by the stimulus of arrangement of pins, which move vertically to a contact skin surface, an effect caused by a stimulus through spraying force or suction force by the air through an injection nozzle or an inlet, an effect caused by a stimulus passing over the skin surface, an effect caused by a stimulus through the contact of an electrode, an effect caused by a stimulus employing electrostatic force, and an effect caused by the reappearance of a feeling of cold and warmth employing an element that may absorb or generate heat, as well as the vibration effect.

The haptic module 154 may be implemented to not only transfer the haptic effects through a direct contact, but also make the haptic effects felt through a user's body parts such as a finger and an arm. Two or more haptic modules 154 may be included according to a configuration of the mobile terminal 100.

The memory 160 may store programs for an operation of the controller 180 and also temporarily store input/output data, such as phonebook data, messages, pictures, and video. The memory 160 may store data relating to various patterns of vibrations and sounds, which are output at the time of touch entry on a touch screen.

The memory 160 may include at least one type of storage media, including a flash memory type, a hard disk type, a multimedia card microphone type, card type memory such as SD or XD memory, random access memory (RAM), static random access memory (SRAM), read-only memory (ROM), electrically erasable programmable read-only memory (EEPROM), programmable read-only memory (PROM) magnetic memory, magnetic disk, and optical disk. The mobile terminal 100 may also operate in association with a web storage that performs a storage function of the memory 160 on the Internet.

The interface unit 170 is often implemented to couple the mobile terminal 100 with external devices. The interface unit 170 is configured to receive data or power from the external devices and transfer the data or power to each component within the mobile terminal 100 or transmit data within the mobile terminal 100 to the external devices. For example, a wired/wireless headset port, an external charger port, a wired/wireless data port, a memory card port, an identity module card port, an audio input/output (I/O) port, a video I/O port, and an earphone port may be included in the interface unit 170.

The identity module is a chip that stores various pieces of information for authenticating usage right of the mobile terminal 100 and may include a user identify module (UIM), a subscriber identity module (SIM), a universal subscriber identity module (USIM) and the like. An apparatus equipped with the identity module or identity device may be fabricated in a smart card form. Accordingly, the identity device may be connected to the mobile terminal 100 via a port.

The interface unit 170 may become a passage through which power source from an external cradle is supplied to the mobile terminal 100 when the mobile terminal 100 is coupled to the cradle or a passage through which a variety of command signals input from the cradle are transferred to the mobile terminal 100 by a user. The variety of command signals or power source input from the cradle may operate as signals to recognize that the mobile terminal 100 has been mounted in the cradle accurately.

The controller 180 typically controls the overall operations of the mobile terminal 100. For example, the controller

180 performs the control and processing associated with voice calls, data communications, and video calls. The controller 180 may include a multimedia module 181 for multimedia playback. The multimedia module 181 may be implemented within the controller 180 or separately from the controller 180. Further, the controller 180 may perform a pattern recognition processing in which writing entry or drawing entry performed on a touch screen can be recognized as text and images.

The power supply 190 provides internal power source and/or external power source required by various components under the control of the controller 180.

The various embodiments described herein may be implemented in a recording medium readable by a computer or its similar devices by employing, for example, software, hardware or some combinations thereof.

For a hardware implementation, the embodiments described herein may be implemented within at least one of application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein or a selective combination thereof. In some cases, the embodiments may be implemented by the controller 180.

For a software implementation, the embodiments such as procedures and functions may be implemented with separate software modules, each of which performs one or more of the functions and operations described herein. Software codes may be implemented using a software application written in any suitable programming language. The software codes may be stored in the memory 160 and executed by the controller 180.

Figure 2A:
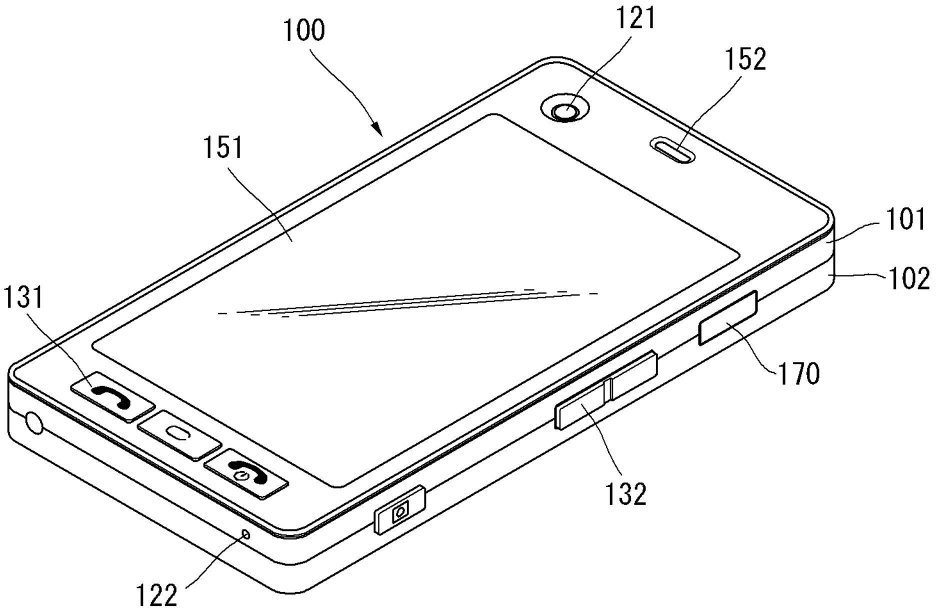
FIG. 2A is a perspective view of a front side of a mobile terminal according to an embodiment of the present invention.

FIG. 2A is a perspective view of a front side of the mobile terminal according to an embodiment of the present invention. In this embodiment, the mobile terminal 100 has a bar-type terminal body. The present invention is not limited to the above example, but may be applied to a variety of configurations in which two or more bodies are coupled in such a way as to move relative to each other, such as slide-type, folder-type, swing-type and swivel-type, and combinations thereof.

A body includes a case, such as a casing, a housing, or a cover, constituting an external appearance of the mobile terminal 100. In the present embodiment, the case is divided into a front case 101 and a rear case 102. A variety of electronic components are built in a space formed between the front case 101 and the rear case 102. At least one intermediate case may be further disposed between the front case 101 and the rear case 102. The cases may be fabricated by injecting synthetic resin or fabricated to have metal materials such as stainless steel (STS) or titanium (Ti).

As shown in FIG. 2A, the display 151, the audio output unit 152, the camera 121, the user input unit 130 (131, 132), the microphone 122, and the interface unit 170 are disposed in the terminal body, mainly, on the front case 101.

The display 151 occupies the greater part of a main surface of the front case 101. The audio output unit 152 and the camera 121 are disposed in an area adjacent to one of both ends of the display 151, and the user input unit 131 and the microphone 122 are disposed in an area adjacent to the other of both ends of the display 151. The user input unit 132 and the interface unit 170 are disposed on the sides of the front case 101 and the rear case 102.

The user input unit 130 is manipulated in order to receive commands for controlling the operations of the mobile terminal 100 and may include the plurality of user input units 131 and 132. The user input units 131 and 132 may also be collectively referred to as a 'manipulating portion' and may adopt any kind of a method as long as it has a tactile manner, which allows a user to manipulate the user input units 131 and 132 while feeling a tactile sense.

Contents input by first and second manipulating portions may be set in various ways. For example, the first manipulating portion may be configured to receive commands, such as start, stop, and scroll, and the second manipulating portion may be configured to receive commands, such as a volume control of audio output from the audio output unit 152 or switching of the display 151 to a touch recognition mode.

Figure 2B:
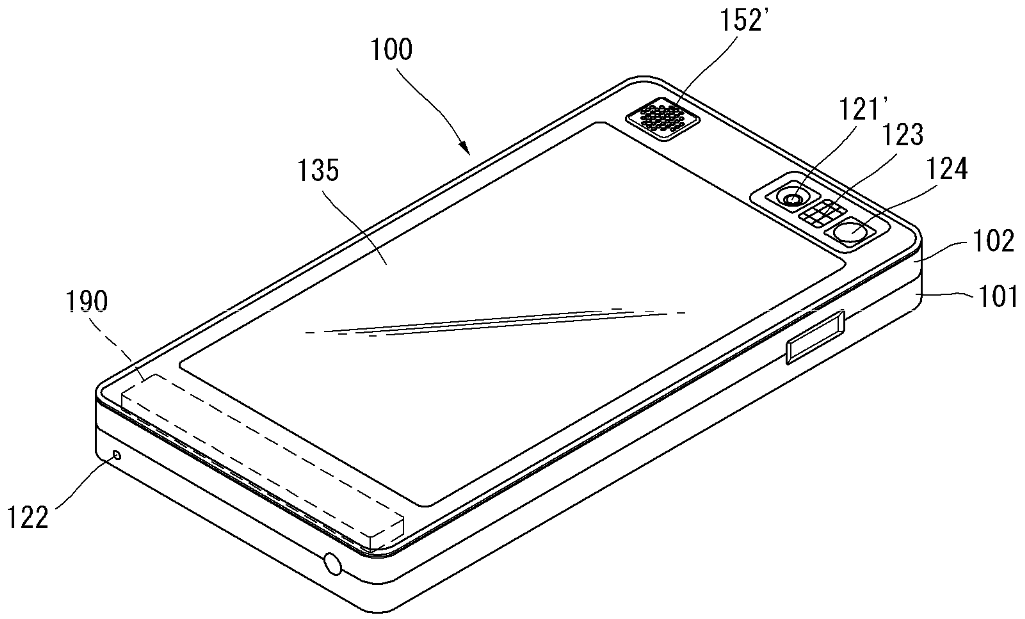
FIG. 2B is a perspective view of a rear side of the mobile terminal shown in FIG. 2A.

FIG. 2B is a perspective view of a rear side of the mobile terminal 100. Referring to FIG. 2B, an additional camera 121' may be mounted on a rear side of the terminal body or in the rear case 102. The camera 121' may be a camera, which faces a direction that is substantially opposite to a direction faced by the camera 121 shown in FIG. 2A and have pixels different from that of the camera 121.

For example, the camera 121 may be operated to capture an image of a user's face with a relatively lower resolution that is sufficient to transmit the captured image to a counterpart party during a video communication. In contrast, the camera 121' may be operated to generate a relatively higher resolution image in order to obtain higher quality pictures for later use or for communicating to others. The cameras 121 and 121' may be installed in the terminal body such that they can be rotated or popped up.

A flash 123 and a mirror 124 may be further disposed adjacent to the camera 121'. The flash 123 irradiates light to a subject when the subject is photographed by the camera 121'. The mirror 124 is useful for assisting a user to position the camera 121 in a self-portrait mode.

An audio output unit 152' may be further disposed on the rear side of the terminal body. The audio output unit 152' may implement a stereo function together with the audio output unit 152 of the front side, as shown in FIG. 2A, and may be used to implement a speakerphone mode at the time of calls.

An antenna 124 for receiving broadcast signals other than an antenna for calls may be further disposed on the side of the terminal body. The antenna 124, constituting a part of the broadcast receiving module 111, as shown in FIG. 1, may be configured to be retracted from the terminal body.

The power supply 190 for supplying power to the mobile terminal 100 may be mounted in the terminal body. The power supply 190 may be configured internally or externally to the terminal body such that it is directly detachable therefrom.

A touch pad 135 for sensing touch may be further mounted in the rear case 102. The touch pad 135 may also be configured in a light-transmitting type display. When the display 151 is configured to output sight information from its both sides, the sight information can also be recognized even through the touch pad 135. Information output to both sides of the display 151 may be controlled by the touch pad 135. Unlike the above described embodiment, in one aspect of the present invention, a display 151 may be further mounted in the touch pad 135 and, therefore, a touch screen may be disposed in the rear case 102.

The touch pad 135 may operate in association with the display 151 of the front case 101. The touch pad 135 may be disposed in parallel to the display 151 in the rear of the display 151. The touch pad 135 may have a size which is identical to or smaller than that of the display 151.

Figure 3A:
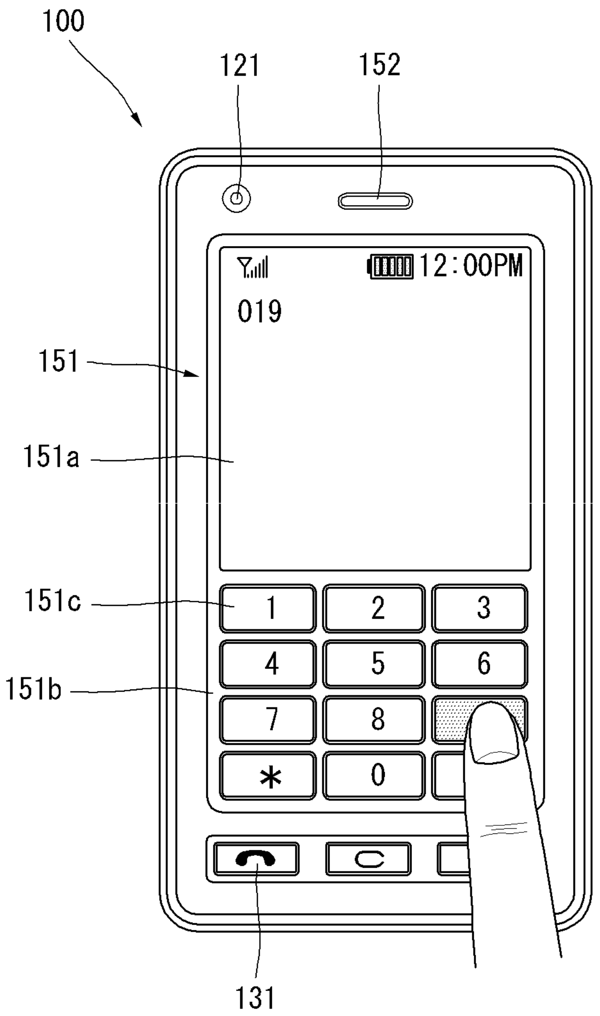
FIGS. 3A and 3B are front views of a mobile terminal according to an embodiment of the present invention showing an operating state.
Figure 3B:
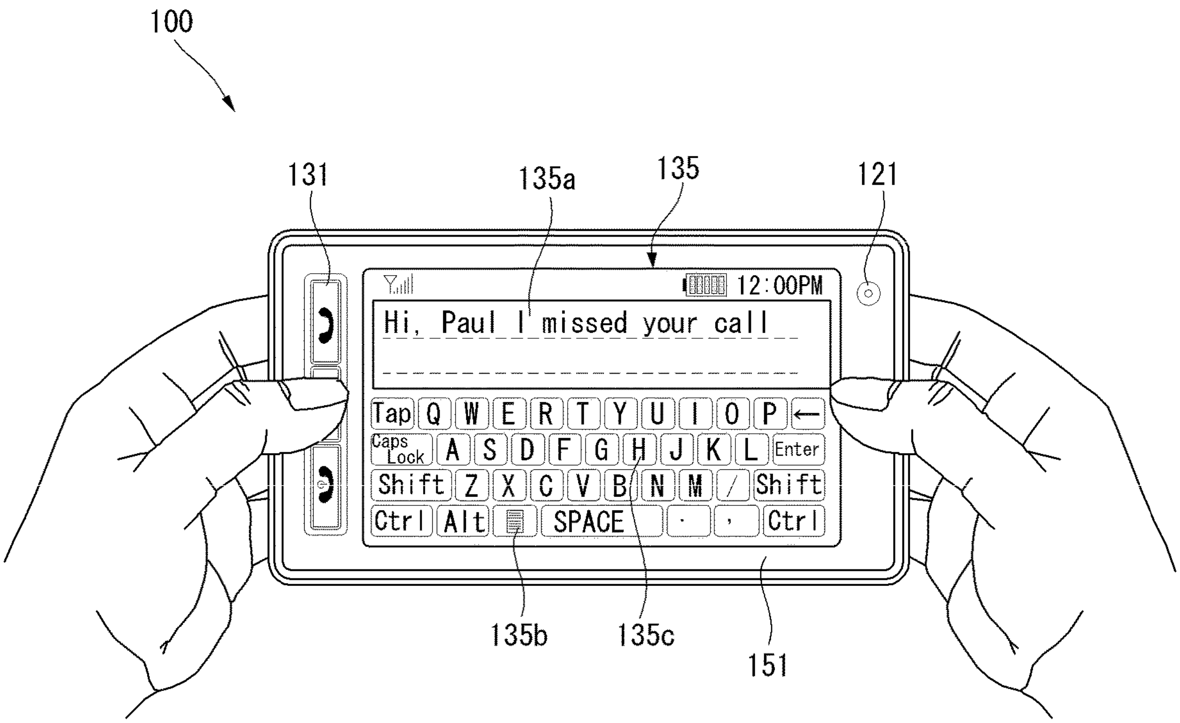

Hereinafter, an associated operation method of the display 151 and the touch pad 135 is described with reference to FIGS. 3A and 3B. FIGS. 3A and 3B are front views of a mobile terminal according to an embodiment of the present invention. Various kinds of visual information may be displayed on the display 151. Such information may be displayed in the form of text, numerals, symbols, graphics, icons and the like.

In order to input such information, at least one of the text, numerals, symbols, graphics and icons may be displayed as a specific arrangement such that it may be implemented in the form of a keypad. This keypad may be referred to as a so-called 'soft key'.

FIG. 3A illustrates that touch applied to the soft keys is input through the front side of a terminal body. The display 151 may be operated over the entire region or operated in the state in which the display is divided into a plurality of regions. In the latter case, the plurality of regions may be configured such that they operate in conjunction with each other.

For example, an output window 151*a* and an input window 151*b* are displayed on upper and lower sides of the display 151, respectively. Soft keys 151*c*, on which numerals for entering a number, such as a telephone number, are displayed, are output to the input window 151*b*. When the soft keys 151*c* are touched, numerals corresponding to the touched soft keys are displayed on the output window 151*a*. If the first manipulating portion or the user input unit 131 is manipulated, call connection to a telephone number displayed on the output window 151*a* is attempted.

FIG. 3B illustrates that touch applied to the soft keys is input through the rear side of a terminal body. While the terminal body is vertically disposed in portrait orientation in FIG. 3A, in FIG. 3B, the terminal body is horizontally disposed in landscape orientation. The display 151 may be configured to have its output screen changed according to the orientation of the terminal body.

Further referring to FIG. 3B, a text entry mode is actuated in the mobile terminal 100. An output window 135*a* and an input window 135*b* are displayed on the display 151. Soft keys 135*c* in each of which at least one of text, symbols, and numerals is displayed may be arranged in plural number in the input window 135*b*. The soft keys 135*c* may be arranged in a QWERTY key form.

When the soft keys 135*c* are touched through a touch pad 135, text, numerals, or symbols corresponding to the touched soft keys, are displayed on the output window 135*a*. As described above, touch input through the touch pad 135 can prevent the soft keys 135*c* from being covered with fingers at the time of touch as compared with touch input through the display 151. When the display 151 and the touch pad 135 are transparent, fingers located in the rear of the terminal body can be seen through the naked eye, enabling more accurate touch input.

The display 151 or the touch pad 135 may be configured to receive touch input through scrolling, as well as the input method disclosed in the above discussed embodiments. A user can move a cursor or pointer located in an object, for example, an icon, which is displayed on the display 151, by scrolling the display 151 or the touch pad 135. Furthermore, when a finger is moved on the display 151 or the touch pad 135, a path along which the finger moves may be visually displayed on the display 151. This may be useful when editing images displayed on the display 151.

One of the functions of the mobile terminal 100 may be executed when the display 151 or touch screen and the touch pad 135 are touched at the same time within a specific time period. When the display 151 or touch screen and the touch pad 135 are touched at the same time, a user may clamp the terminal body using his thumb and index finger. One of the functions may be, for example, activation or inactivation of the display 151 or the touch pad 135.

Figure 4:
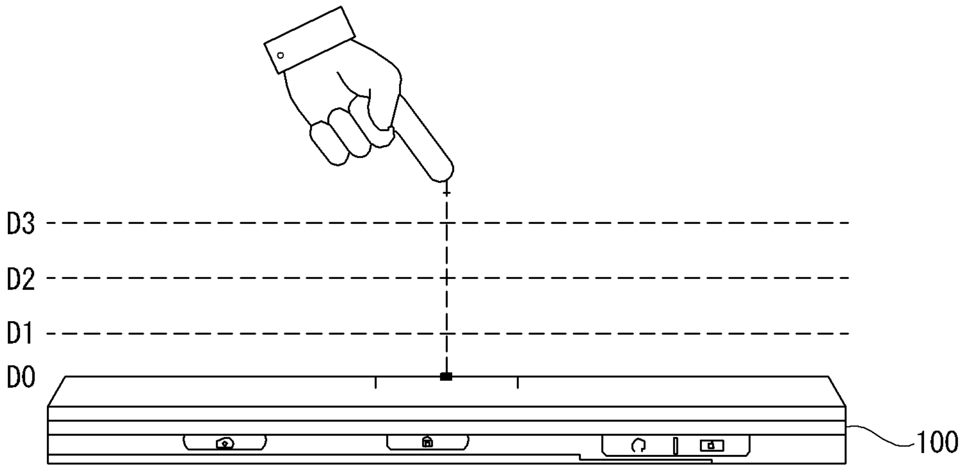
FIG. 4 is a conceptual diagram showing the proximity depth of a proximity sensor in a mobile terminal according to an embodiment of the present invention.

The proximity sensor 141 described with reference to FIG. 1 is described in more detail with reference to FIG. 4. FIG. 4 illustrates the proximity depth of the proximity sensor. As shown in FIG. 4, when a pointer, such as a user's finger, approaches a touch screen, the proximity sensor 141 disposed within or near the touch screen detects such approach and outputs a proximity signal.

The proximity sensor 141 may be configured to output a different proximity signal depending on a distance between the pointer in proximity and the touch screen, and the distance is referred to as a "proximity depth." A distance in which a proximity signal is output when a pointer approaches the touch screen is called a detection distance. In short, the proximity depth can be determined by comparing proximity signals output from a plurality of proximity sensors 141 detecting different proximity depths.

FIG. 4 shows a cross section of a touch screen in which the proximity sensor 141 capable of detecting, for example, three proximity depths is disposed. Alternatively, a proximity sensor 141 capable of detecting less than three, or four or more proximity depths is also possible. Specifically, when the pointer is directly touched on the touch screen (D.sub.0), it is recognized as a contact touch. When the pointer is separated from the touch screen at a distance D.sub.1 or less, it is recognized as a proximity touch of a first proximity depth. When the pointer is separated from the touch screen by more than a distance D.sub.1 and less than a distance D.sub.2, it is recognized as a proximity touch of a second proximity depth. When the pointer is separated from the touch screen by more than a distance D.sub.2 and less than a distance D.sub.3, it is recognized as a proximity touch of a third proximity depth. In addition, when the pointer is separated from the touch screen by a distance D.sub.3 or more, it is recognized that a proximity touch is released.

Accordingly, the controller 180 recognizes the proximity touch as various input signals according to a proximity distance or a proximity position of the pointer with respect to the touch screen and can perform various operation controls based on the recognized various input signals. In the following description of the present invention, the display 151 is implemented as a touch screen and the term touch screen 151 will be used instead of the display 151. Further, in the following description, 'touch' includes both a proximity touch and a contact or direct touch. Moreover, 'touch input' includes all types of input signals corresponding to various types of touches, such as touch down, touch up, the lapse of a present sustain time subsequent to touch, drag and drop.

Figure 5:
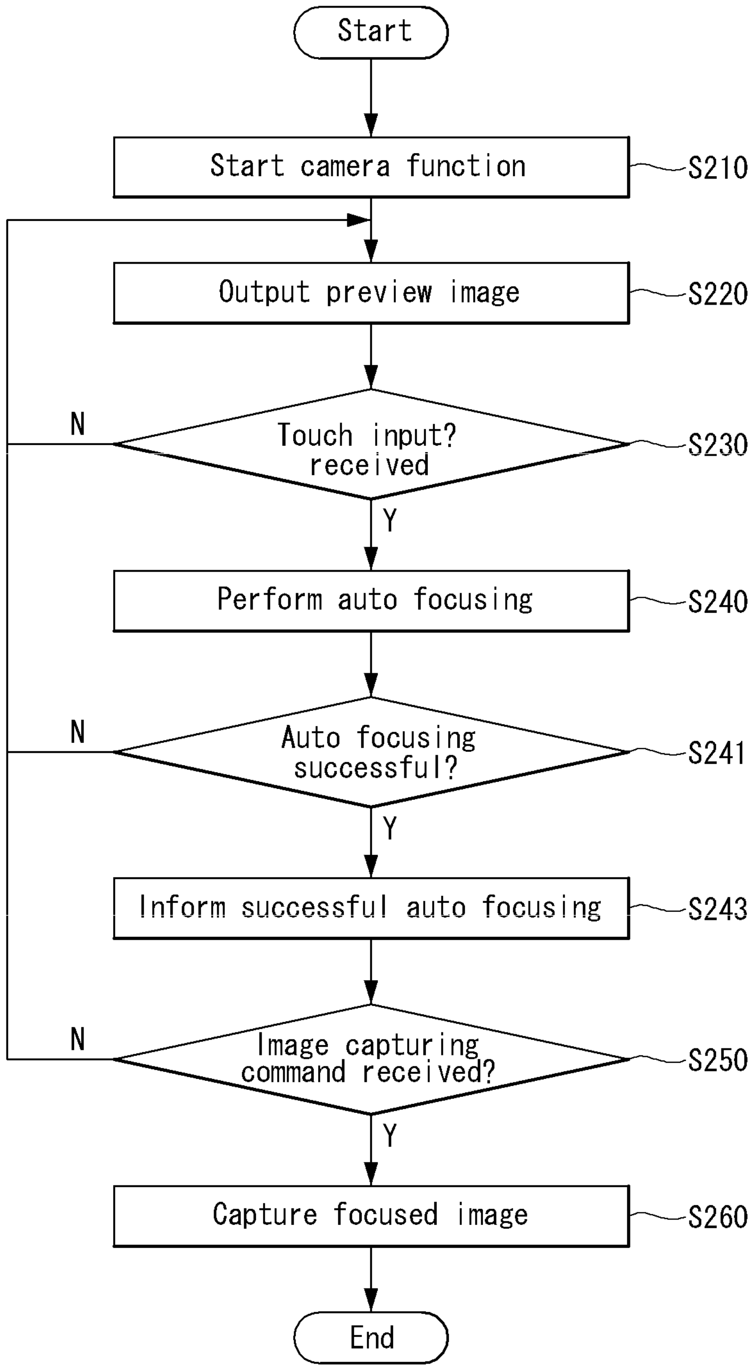
FIG. 5 is a flowchart illustrating image capturing in a mobile terminal equipped with a touch screen according to an embodiment of the present invention.

FIG. 5 is a flowchart illustrating a process of capturing an image in a mobile terminal equipped with a touch screen according to an embodiment of the present invention. FIGS. 6A to 6E and 7A and 7B illustrate a process performed on the touch screen of the mobile terminal, each figure corresponding to a different step in the flowchart shown in FIG. 5. An image capturing method in the mobile terminal 100 including the touch screen according to an embodiment of the present invention is described with reference to FIGS. 5 to 7B.

When a camera function is selected from a menu displayed on the touch screen 151, including the sensing unit 140, or when a camera function of the camera 121 or 121' in the mobile terminal 100 is initiated in response to a user input received via the user input unit 130 [S210], the controller 180 displays a preview of an image input or received through the camera 121 or 121' on the touch screen 151 [S220].

Figure 6A:
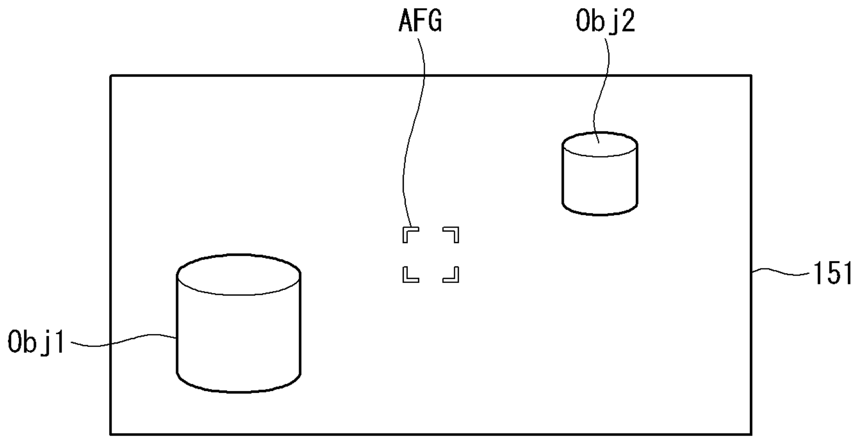
FIGS. 6A to 6E and 7A and 7B are diagrams illustrating image capturing via a touch screen of a mobile terminal according to an embodiment of the present invention.
Figure 6B:
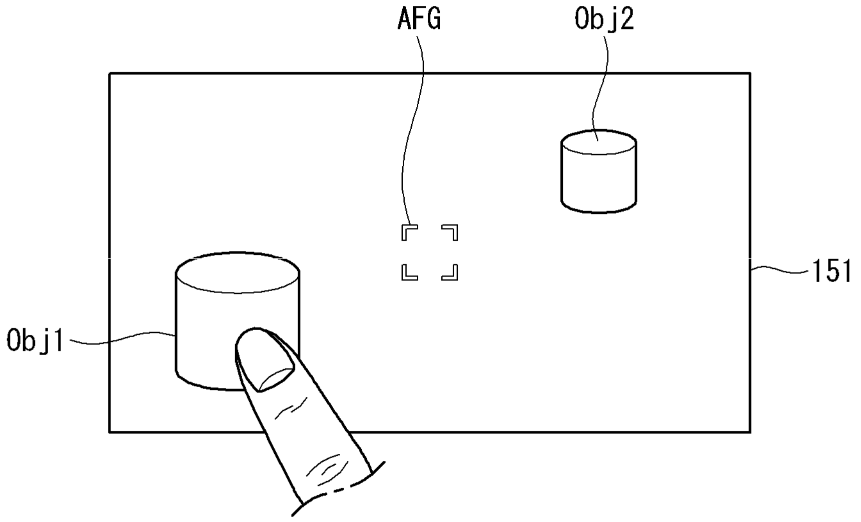

FIG. 6A shows an example in which S220 is implemented, displaying the preview image on the touch screen 151. The preview image is displayed on the touch screen 151 when an image is input through the camera 121 or 121'. For example, the image is processed into a low-resolution image and then displayed on the touch screen 151

Further referring to FIG. 6A, an auto focus guide (AFG), indicating a position on which focusing will be performed or a focus window for an image to be captured, is generally displayed at a central portion of the touch screen 151. In one aspect of the present invention, the AFG is displayed at the central portion of the touch screen 151 by default when the camera function is initiated. Alternatively, the AFG may not be displayed when the camera function is initiated until a touch input is received on the preview image.

In the image capturing method according to an embodiment of the present invention, a user moves the AFG to a specific position on the touch screen 151 such that auto focusing is performed on the specific position where the AFG is displayed. For example, when a preview image displayed on the touch screen 151 includes two objects Obj1 and Obj2 as shown in FIG. 6A, the user touches any one of the two objects to select an object to be focused. For example, in FIG. 6B, the first object Obj1 is selected by touching Obj1 with the user's finger or a stylus pen.

When an edge with a sharpness equal to or higher than a specific level is retrieved at the same position from image analysis of a plurality of images input via the camera 121 or 121', this is referred to as an object. According to the present embodiment, auto focusing is performed when the focus window is moved to a specific position on the touch screen 151 by a user's touch input. Accordingly, in the present invention, focusing on an object which is not located at the center of the touch screen 151 is possible.

In order to perform successful focusing with respect to a position on a preview image selected by touch according to the auto focusing method described below, an object or a target on which the focusing will be performed must be present at the selected position. Accordingly, if focusing is performed on the selected position, focusing is performed also on the object present at the selected position.

Accordingly, the controller 180 performs a focusing operation on an object present at a corresponding position by focusing on a position corresponding to a coordinate value, which is input according to touch on the touch screen 151, thereby without determining whether the object is present in the focus window or without conducting additional image analysis such as determination of sharpness for each pixel of the preview image. If focusing fails due to absence of an object at a position corresponding to a coordinate value input according to the touch, the controller 180 may perform focusing on an object that is adjacent to the position by widening the AFG or focus window as wide as a preset range based on the corresponding coordinate value and then re-performing focusing on the adjacent object.

While the number of objects displayed on the preview image is two in FIGS. 6A-8B for convenience of description, this configuration is only for illustrative purpose. It is to be understood that the number of objects is not limited and auto focusing may be performed when two or more objects are present on the preview image. The focusing according to the present invention can be performed with respect to any selected specific position and regardless of the position of an object on the screen. Therefore, an object that is selected by a user may be any object displayed on the preview image. However, the controller 180 may be configured such that edge portions of the touch screen 151 are not selected as a position for auto focusing, as auto focusing may not be performed successfully on the edge portions.

Figure 7A:
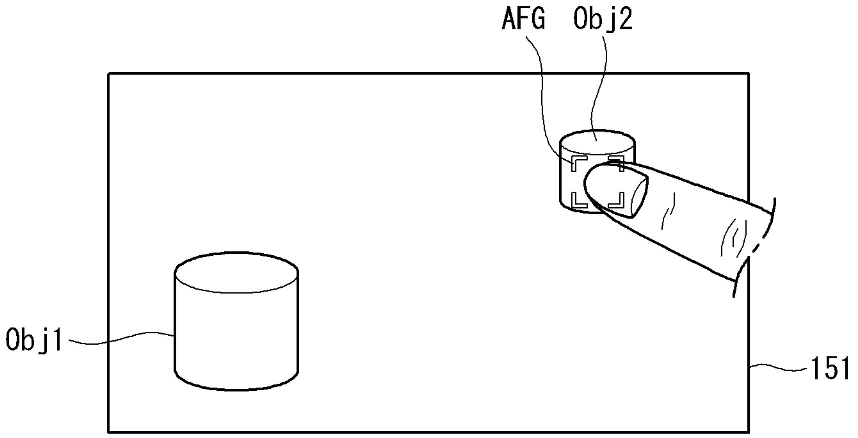

FIG. 7A shows an example in which the second object Obj2 is touched and selected on the preview image initially shown in FIG. 6A. The controller 180 determines whether touch input has been received on the touch screen 151 [S230]. While there are various types of touch input and the method of the touch input is not limited, in the present embodiment, touch is sustained for a preset period of time in order to be recognized as touch input for auto focusing.

Figure 6C:
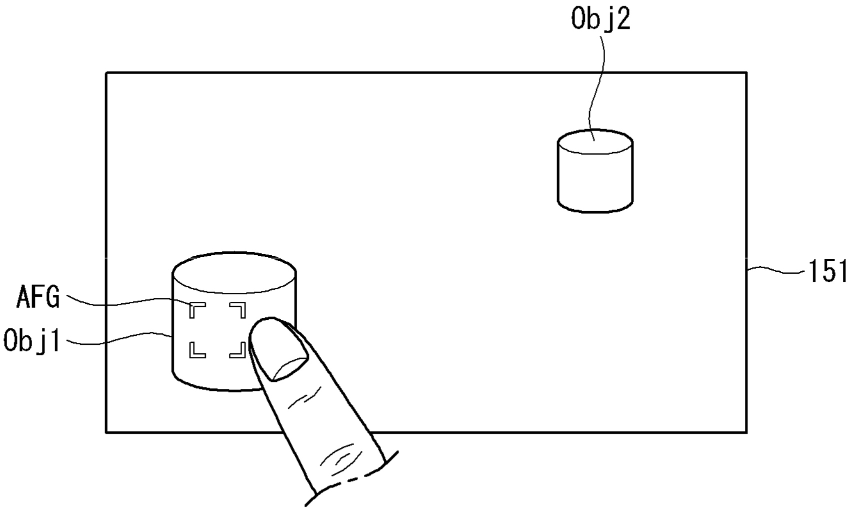

When the touch screen 151 is touched and the touch or contact is sustained for a preset period of time, for example, one second or more, the controller 180 moves the focus window to the touched position and then displays the AFG at the position of the focus window, as shown in FIG. 6C. Next, the controller 180 performs auto focusing at the position of the focus window where the touch input has been received [S240]. Control of the camera 121 or 121' for auto focusing may employ a known auto focusing mechanism depending on the type of the camera 121 or 121'. For example, the controller 180 controls focusing on the first object Obj1, present at the selected position, to be performed by directly controlling a lens provided in the camera 121 or 121' and a motor for driving the lens.

Figure 6D:
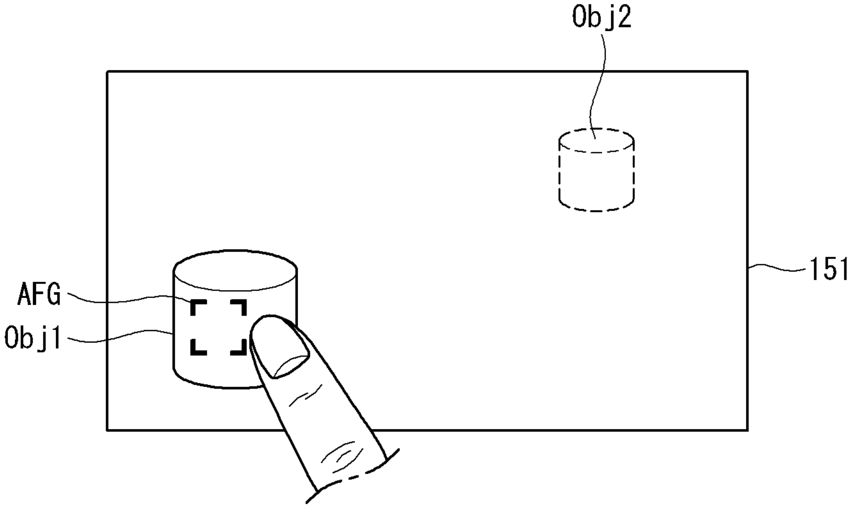

If the auto focusing on the first object Obj1 present at the selected position is successful [S241: Y], the controller 180 informs a user that auto focusing has been successful via the output unit 150 [S243]. For example, the controller 180 outputs a shutter sound through the alarm unit 153 and/or changes the color of the AFG, as shown in FIG. 6D. Further, the controller 180 may perform one or more of a variety of graphic representation in combination, including the output of a sound, a change in the color of an image and/or text on the touch screen 151, flicker and the like.

Once the user is informed about the result of focusing on the first object Obj1 present at the selected position, the user subsequently inputs an image capturing command to take a picture or capture the focused image. According to an embodiment of the present invention, the image capturing command is released of the contact or touch, for example, by taking off the user's finger or the stylus pen from the position where the contact or touch is currently sustained.

Figure 6E:
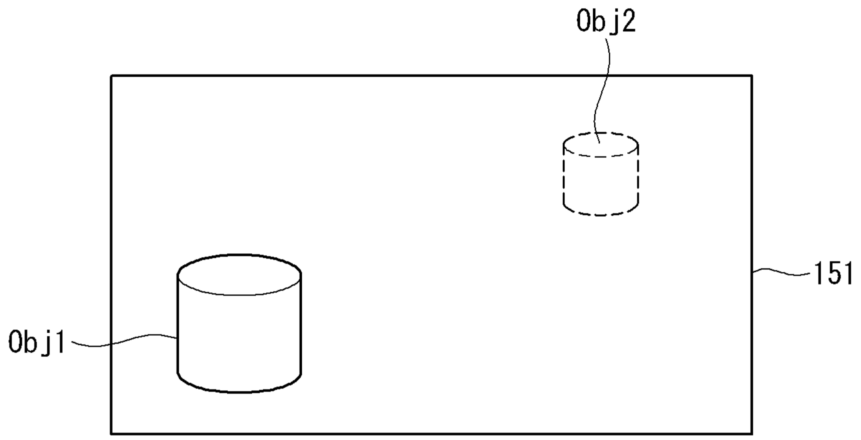

Accordingly, the controller 180 determines whether an image capturing command has been input by a user [S250]. If it is determined that the image capturing command has been input, the controller 180 immediately controls the camera 121 or 121' to capture an image focused on the first object Obj1 [S260], as shown in FIG. 6E. While FIG. 6E shows an image captured by performing auto focusing on the first object Obj1, FIG. 7B shows an image captured by performing auto focusing on the second object Obj2.

Figure 7B:
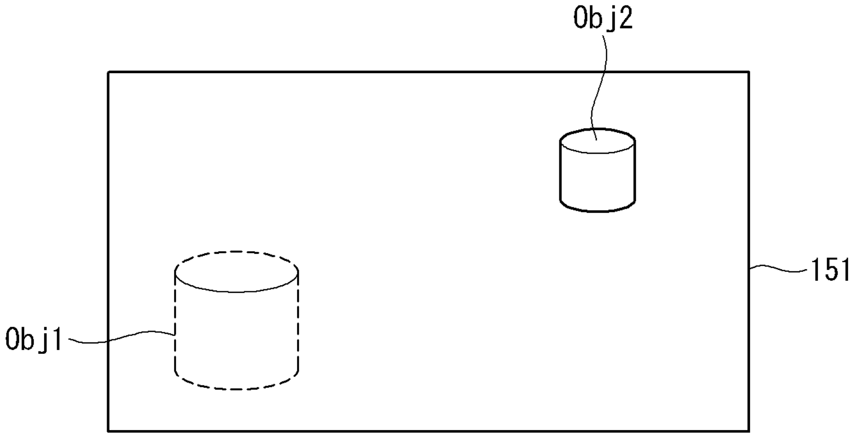

As shown in FIGS. 6E and 7B, according to the present invention, a position on which auto focusing will be performed, that is, a focus window can be changed by a user. Accordingly, in a captured image, any one object is focused and may be displayed sharply while the remaining objects are not focused and may look blurred. Therefore, even a non-professional photographer can achieve a high-quality photograph, such that depth of a close subject is properly represented, by using the image capturing method according to the present invention.

While the controller 180 may perform image capturing by determining the end of the contact touch as the input for an image capturing command as described above, thus capturing the image right after the contact touch has been released, the controller 180 may also be configured to recognize the input for the image capturing command when a preset period of time has elapsed from the end of the contact touch, thus performing the image capturing after the preset period of time since the release of the contact touch.

Alternatively, after the focusing has been successful after the touch had been sustained for a preset period of time, the controller 180 may inform a user of the successful focusing such that the user can finish the touch input. Thereafter, if there is no additional touch input from the user for another preset period of time since the focusing was successful or the contact touch was released, the controller 180 recognizes an image capturing command after another preset period of time since the release of the contact touch and controls the camera 121 or 121' to capture an image at that time point.

Alternatively, the controller 180 may be configured to display a specific icon for inputting an image capturing command on the touch screen 151 when a camera function begins or the focusing has been successful such that the image is captured when the icon is selected by the user.

Figure 8A:
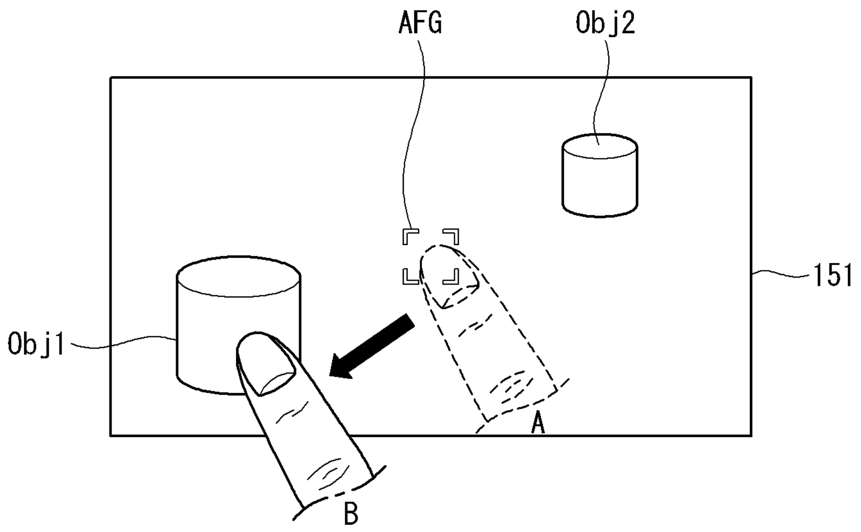
FIGS. 8A and 8B are diagrams illustrating image capturing via a touch screen of a mobile terminal according to another embodiment of the present invention.
Figure 8B:
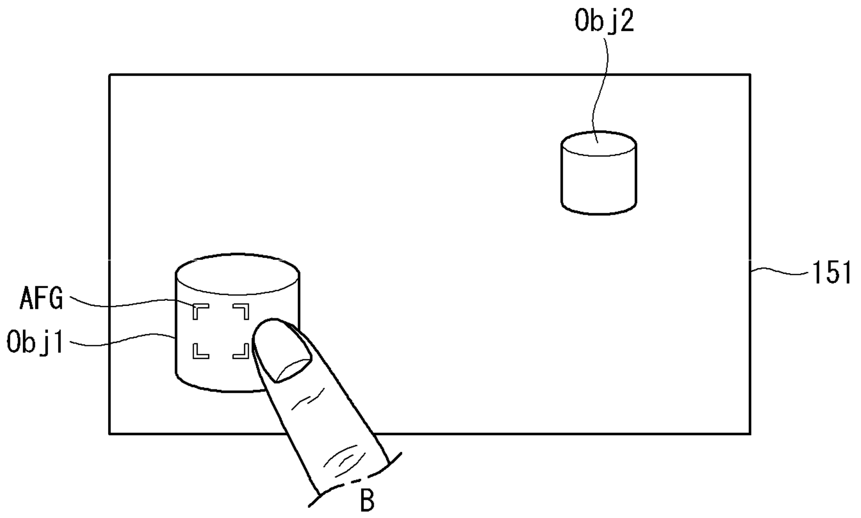

FIGS. 8A and 8B illustrate a process of performing image capturing in a mobile terminal according to an embodiment of the present invention. Some of the above described features may also be applied to this embodiment.

When the function of the camera 121 or 121' is initiated S210 as illustrated in FIG. 5, a preview image is displayed on the touch screen 151 at S220. Subsequently, the controller 180 determines whether touch input has been received on the touch screen 151 at S230. In the present embodiment, the position to be focused on the preview image is controlled by touch input comprising a "drag-and-drop" operation.

Therefore, upon receiving the touch input, the controller 180 determines whether the touch input is a "drag-and-drop" operation. In the present invention, the "drag-and-drop" operation refers to touching or contacting an AFG on a preview image screen as shown in FIG. 8A, and then sliding a finger or a touching object from the initially contacted position or the AFG to another position, maintaining the contact with the touch screen 151 during the sliding, thus finishing the touch. This "drag-and-drop" operation includes a "touch-and-drag" operation.

Referring to FIG. 8A, a user performs a drag-and-drop operation by touching the position A where the AFG is initially displayed and then sliding the finger from the touched position A to the position B where the first object Obj1 is positioned on the preview image. If touch input according to the drag-and-drop operation is generated [S230: Y in FIG. 5], the controller 180 moves a focus window to the position B where the drop has occurred and then displays the AFG at the position of the focus window, as shown in FIG. 8B. Subsequently, the controller 180 performs auto focusing operation on the position of the focus window, that is, the position B where the drop has occurred [S240]. In other words, according to this embodiment, a user moves the AFG from a first position to a second position to be focused by the "drag-and-drop" or "touch-and-drag" operation.

In one aspect of the present invention, the controller 180 is configured to move the focus window and perform the auto focusing operation at the moved focus window only when the touch or contact is sustained at the position B where the drop has occurred for a period of time that is equal to or more than a preset period of time. If the auto focusing operation on the first object Obj1 or at the selected position B is successful [S241: Y], the controller 180 informs the user of the successful auto focusing [S243] via the output unit 150 such that the user can confirm the focusing with respect to the selected first object Obj1. Thereafter, an image capturing command is input, for example, by finishing or releasing the sustained touch or contact touch [S250: Y], and the controller 180 controls the camera 121 or 121' to capture the focused image of the first object Obj1, as shown in FIG. 6E [S260].

Alternative to the above described embodiment, in one aspect of the present invention, the controller 180 may be configured to move the focus window to the position B where the drop has occurred and control the camera 121 or 121' to perform the auto focusing operation immediately after the drag-and-drop operation is executed. Thereafter, if additional touch input is not entered by a user for a preset period of time, the controller 180 captures an image when the preset period of time elapses.

Figure 9:
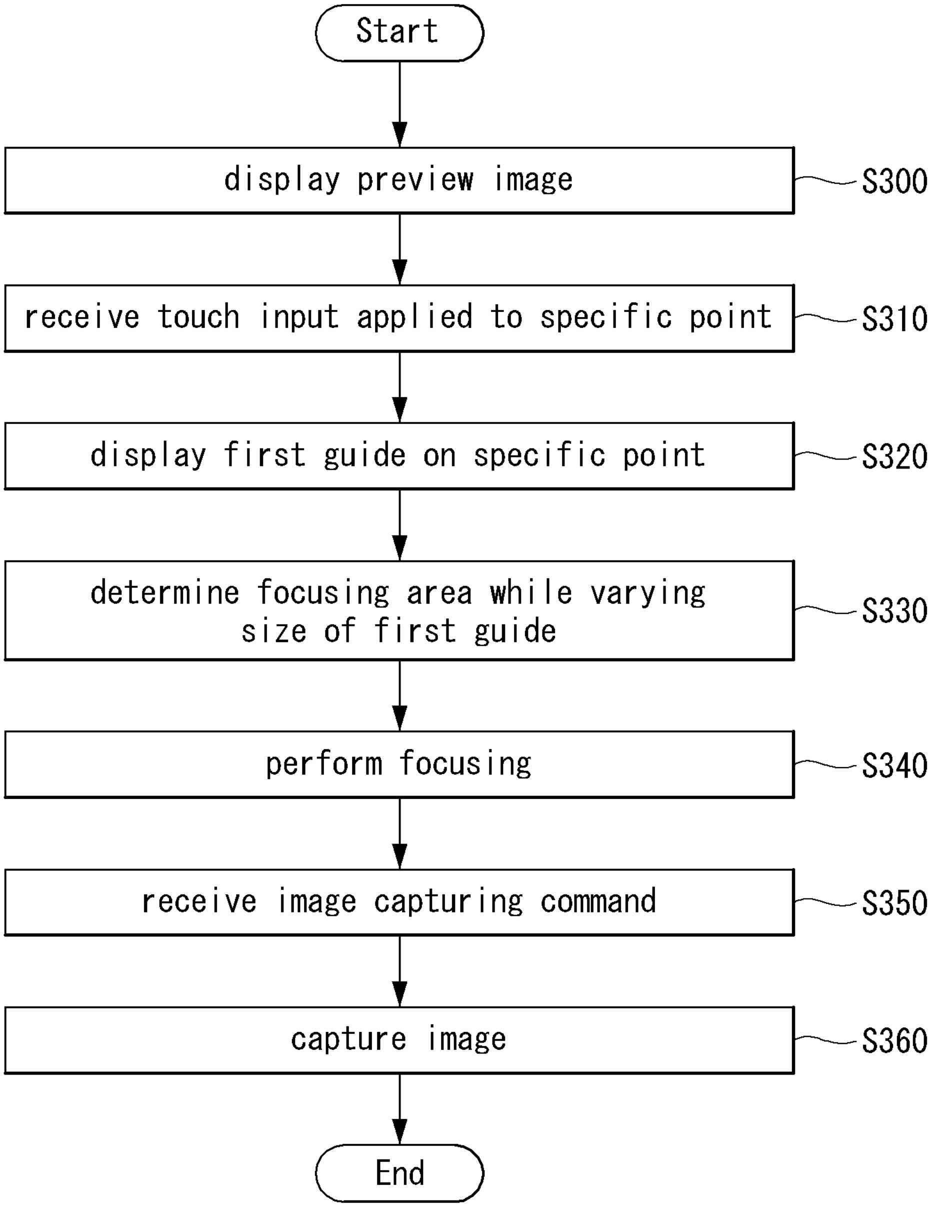
FIG. 9 is a flowchart illustrating image capturing in a mobile terminal according to another embodiment of the present invention.

FIG. 9 is a flowchart illustrating a process of capturing an image in a mobile terminal according to another embodiment of the present invention and FIGS. 10 to 15 are diagrams illustrating the image capturing process shown in FIG. 9.

The image capturing process according to this embodiment may be implemented in the mobile terminal 100 described above with reference to FIGS. 1, 2, 3 and 4. The image capturing process in the mobile terminal 100 and the operation of the mobile terminal 100 for implementing the image capturing process will now be explained in detail with reference to the attached drawings.

Referring to FIG. 9, the controller 180 may display a preview image captured through the camera 121 on the touch screen 151 [S300].

Figure 10:
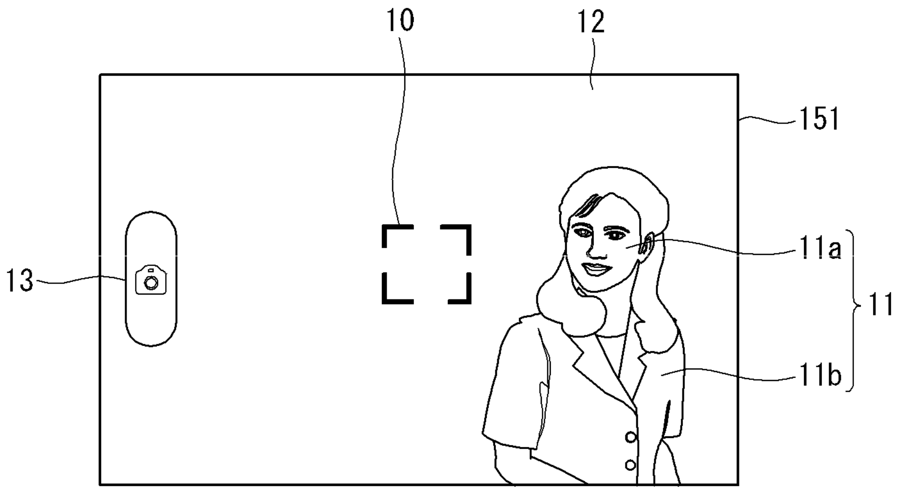
FIGS. 10 to 15 are diagrams illustrating the image capturing process shown in FIG. 9.

For example, when the mobile terminal enters an image capturing mode using the camera 121, as shown in FIG. 10, the controller 180 can capture a preview image 12 and display the preview image 12 on the touch screen 151. Furthermore, the controller 180 may provide a first guide 10 corresponding to the aforementioned AFG to a predetermined position while displaying the preview image 12, as shown in FIG. 10. For example, the first guide 10 can be located at the center of the touch screen 151 or the preview image 12 as a default position. In addition, the controller 180 may display a soft key 13 for receiving an image capturing command on the touch screen 151 as described below.

Further referring to FIG. 10, the preview image 12 may include at least one object 11. The preview image 12 generally includes a plurality of existent objects because the preview image 12 is acquired by taking a picture of the real world. The controller 180 may recognize at least part of the objects included in the preview image 12. The object 11 shown in FIG. 10 is a person and includes a first sub object 11*a* corresponding to the person's face and a second sub object 11*b* corresponding to the person's body. In this document, the object included in the preview image 12 is simplified for convenience of description. The preview image 12 can include a plurality of various objects when the technical spirit disclosed in this document is actually implemented.

Figure 11:
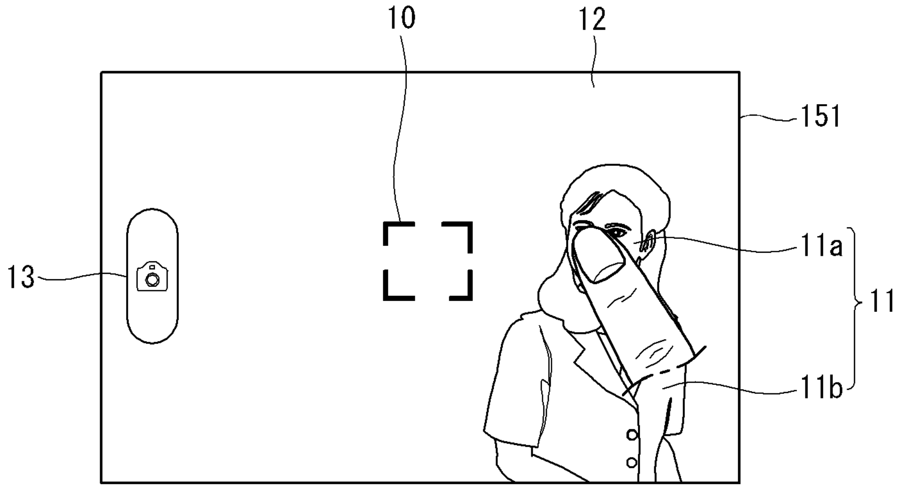

The controller 180 may receive touch input applied to a specific point on the preview image 12 [S310]. For example, the user can touch a point corresponding to the first sub object 11 a with a finger, as shown in FIG. 11.

Figure 12:
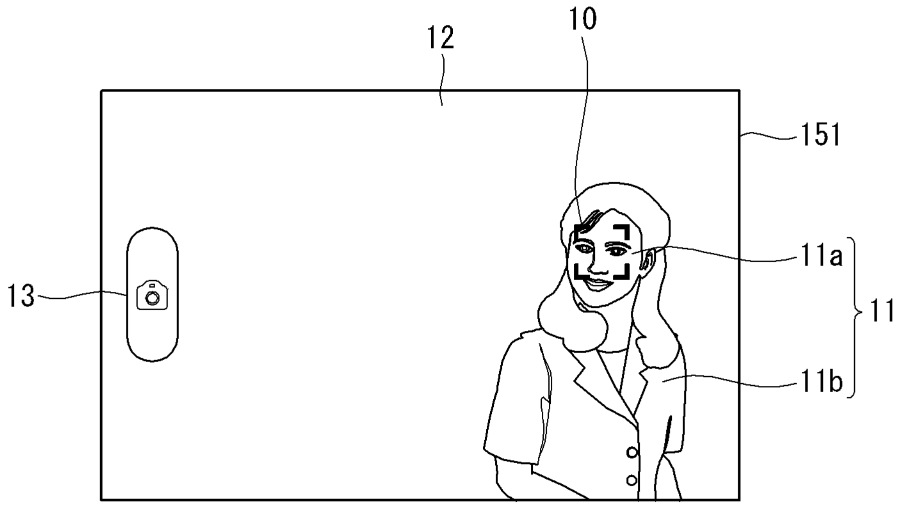

The controller 180 may display the first guide 10 on the touched point [S320]. For example, the controller 180 can display the first guide 10, which has been displayed at the center of the touch screen 151, on the first object 11 a corresponding to the touched point, as shown in FIG. 12.

Although the first guide 10 is automatically displayed on the touch screen 151 when the mobile terminal enters the image capturing mode in this embodiment, the technical spirit of the present invention is not limited thereto. For example, when the user touches a specific point on the preview image 12 while the first guide 10 is not provided at S300, the first guide 10 may be displayed on the touched point. The first guide 10 provided at S300 or S320 may be displayed in a predetermined size.

The controller 180 may determine a focusing area for focusing on the object corresponding to the touched point while varying the size of the first guide 10 displayed in the predetermined size [S330]. The focusing area means a reference area for detecting the sharpness of an edge when auto-focusing is performed. The focusing area may be referred to as an auto focus window (AFW).

For example, the controller 180 can determine the first guide 10 as the focusing area when the area of the first guide 10 including the object corresponding to the touched point becomes a minimum size. That is, the controller 180 can match the AFG corresponding to the first guide 10 and the AFW corresponding to the focusing area. The matching the AFG and the AFW may include not only 100% matching but also matching in an error range.

An example of the operation of the controller 180 to perform step S300 is explained with reference to FIGS. 13 and 14.

Figure 13:
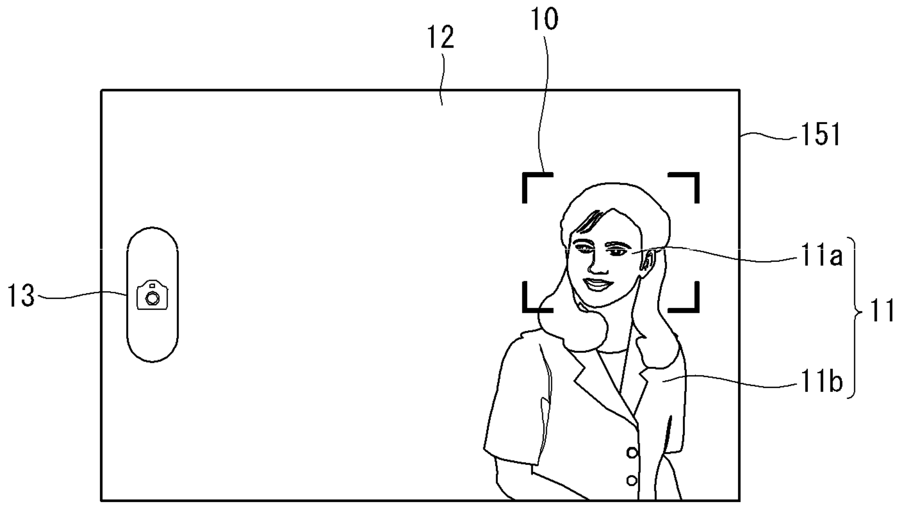

The controller 180 may magnify the first guide 10 shown in FIG. 12 at a predetermined magnification and display the magnified first guide 10 as shown in FIG. 13. The magnified first guide 10 can include the first sub object 11*a* on which the user wants to focus.

Figure 14:
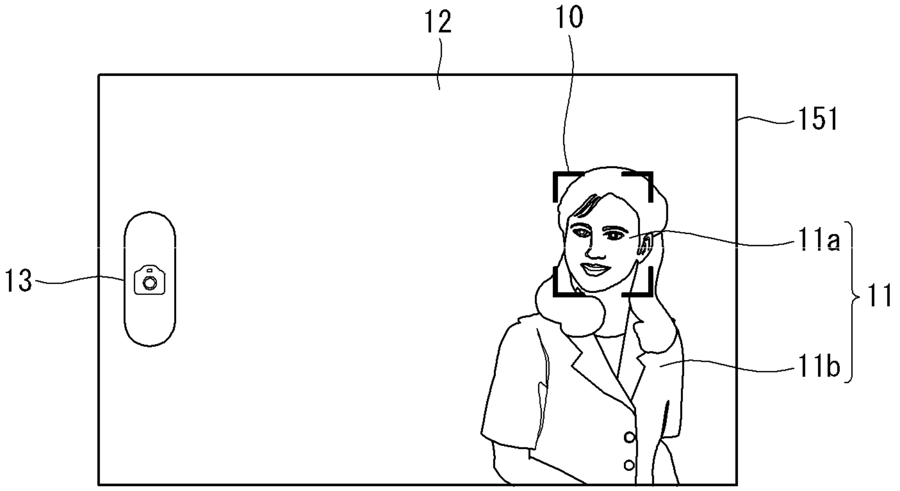

Referring to FIG. 14, the controller 180 may gradually reduce the size of the magnified first guide 10 until the first guide 10 circumscribes the first sub object 11*a*. The controller 180 may determine the first guide circumscribing the first sub object 11*a* as the focusing area. Upon determining the focusing area, the controller 180 may focus on the image currently displayed on the touch screen 151 based on the focusing area [S340].

The controller 180 may receive an image capturing command from the user [S350] and capture the image according to the image capturing command [S360]. The controller 180 may automatically capture the image as soon as the focusing is completed at S340.

When a face recognition function is activated and the object focused according to the embodiment is a person's face, the controller 180 may perform face recognition on the focusing area.

According to a conventional face recognition technique, the overall area of a preview image captured through the camera 121 is scanned to detect a face. However, the present invention performs face recognition on the focusing area, and thus the quantity of computations of the controller 180 can be remarkably reduced and various resources required to perform the face recognition can be effectively decreased.

The controller 180 may provide various menus relating to image characteristics when the focusing area is determined through a variation in the size of the first guide 10.

Figure 15:
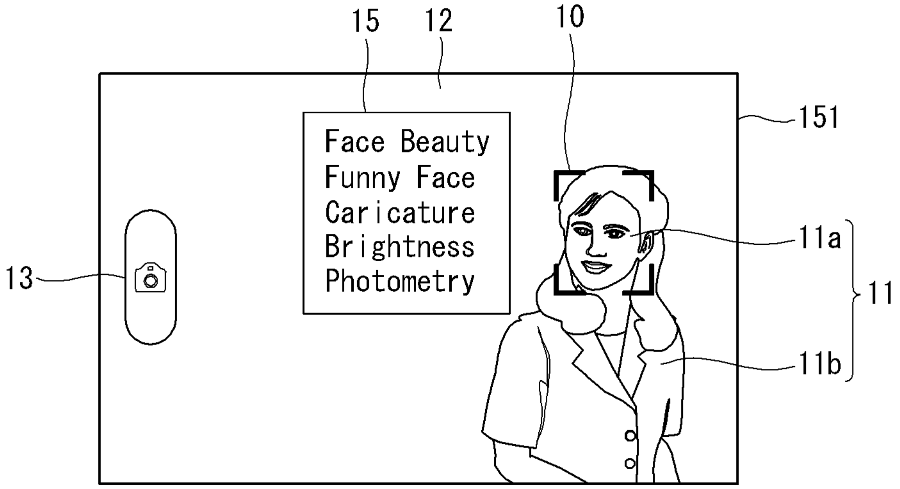

Referring to FIG. 15, the controller 180 can provide a menu window 15 including various menus relating to image characteristics in the vicinity of the first guide 10. The menu window 15 may be varied with the type of the object included in the first guide 10.

For example, when the first sub object 11 a corresponding to the first guide 10 is recognized as a face, as shown in FIG. 15, the controller 180 can provide at least one menu for varying the image characteristic of the recognized face.

In FIG. 15, menu "Face Beauty" corresponds to a function of removing blemishes of the recognized face and menu "Funny Face" corresponds to a function of overlaying a funny image on the recognized face to interest the user. In addition, menu "Caricature" corresponds to a function of giving cartoon effect or sketch effect tot eh recognized face.

Furthermore, the menu window 15 may include at least one menu for varying the characteristic of the whole preview image 12 irrespective of the recognized object 11*a*, as shown in FIG. 15. For example, the controller 180 can provide menu "Brightness" for adjusting the brightness of the preview image 12 and menu "Photometry" for controlling photometry through the menu window 15.

Figure 16:
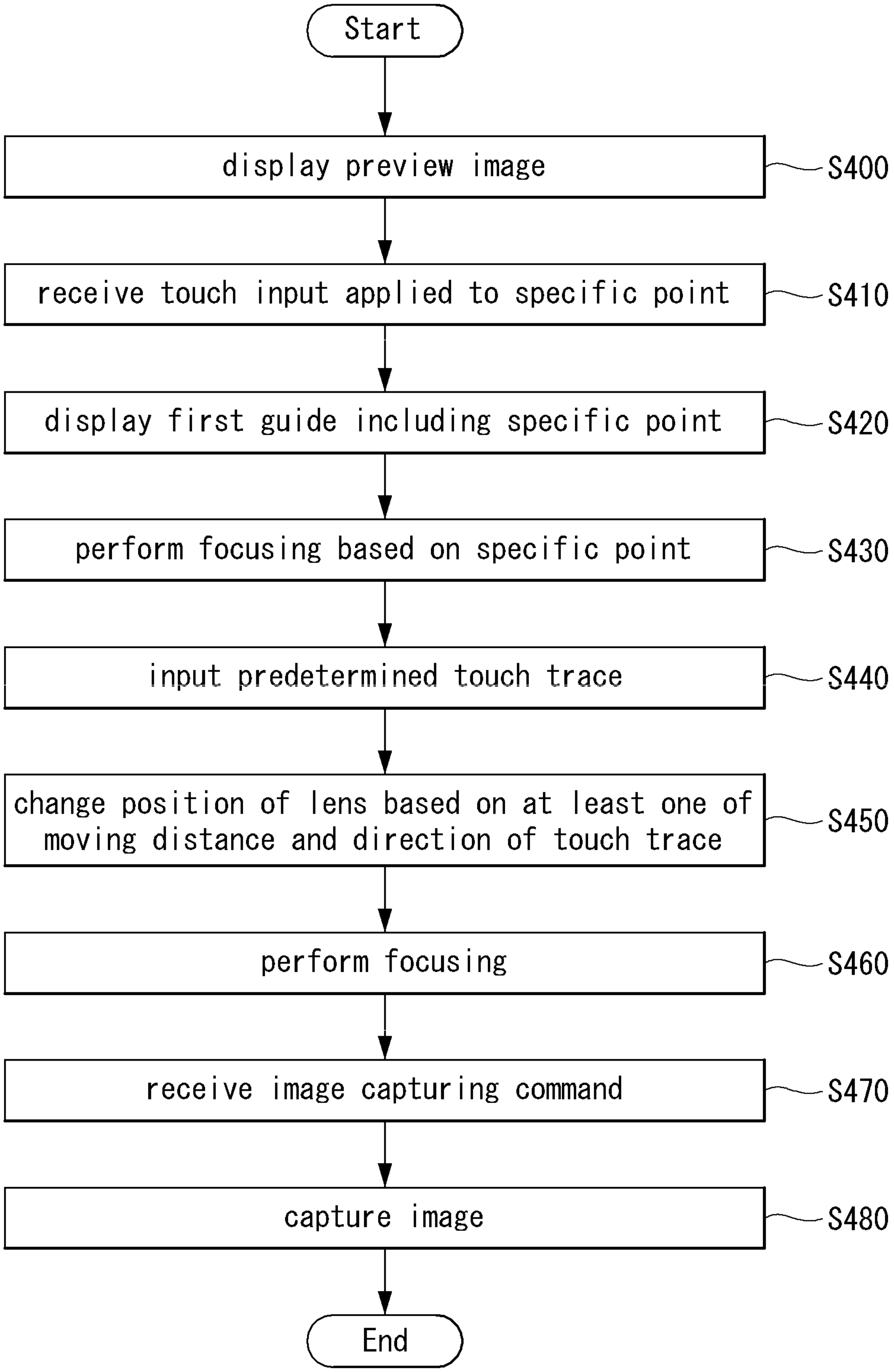
FIG. 16 is a flowchart illustrating image capturing in a mobile terminal according to another embodiment of the present invention.

FIG. 16 is a flowchart illustrating a process of capturing an image in a mobile terminal according to another embodiment of the present invention and FIGS. 17 to 23 are diagrams illustrating the image capturing process shown in FIG. 16.

The image capturing process according to this embodiment may be implemented in the mobile terminal 100 described above with reference to FIGS. 1, 2, 3 and 4. The image capturing process in the mobile terminal 100 and the operation of the mobile terminal 100 to implement the image capturing process will now be explained in detail with reference to the attached drawings.

Referring to FIG. 16, the controller 180 may display a preview image captured through the camera 121 on the touch screen 151 [S400], which corresponds to step S300 according to the above embodiment.

The controller 180 may receive touch input applied to a specific point on the preview image displayed on the touch screen 151 [S410], which corresponds to step S310 according to the above embodiment.

The controller 180 may display the first guide including the touched specific point [S42], which corresponds to step S320 according to the above embodiment, and focus on the image based on the touched specific point [S430].

Figure 17:
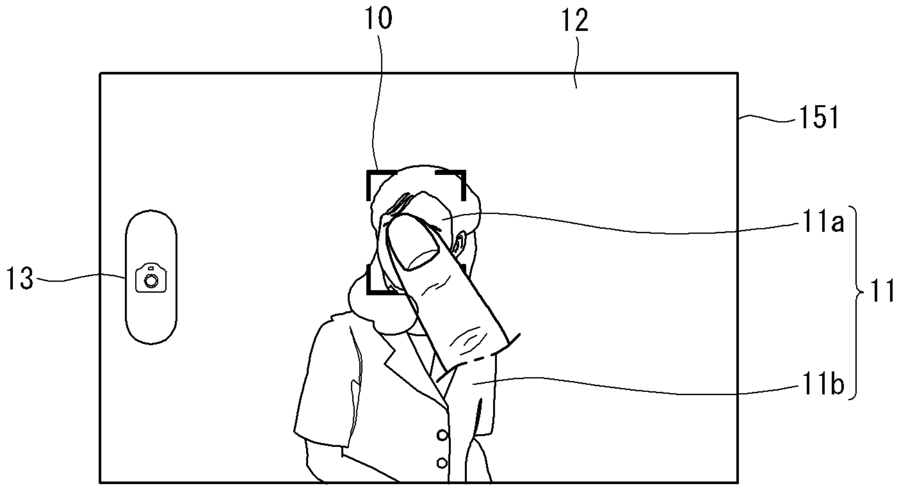
FIGS. 17 to 23 are diagrams illustrating the image capturing process shown in FIG. 16.

Steps S410, S420 and S430 may be performed according to the above embodiment shown in FIG. 9. For example, when the user touches the first sub object 11*a*, as shown in FIG. 17, the controller 180 can display the first guide 10 such that the first guide 10 includes the first sub object 11*a* and focus on the image based on the area corresponding to the first guide 10 or a reference point (for example, center point) in the first guide 10.

Figure 18:
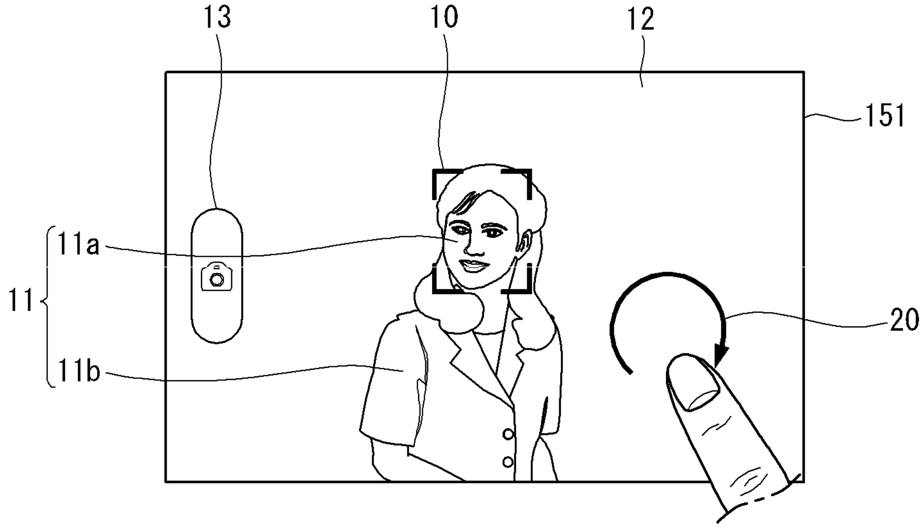

The controller 180 may receive predetermined touch trace upon focusing on the image based on the specific point [S440]. For example, the user can input circular touch trace 20 to the touch screen 151, as shown in FIG. 18.

The position of the lens included in the camera module providing the auto-focusing function can be changed or adjusted for auto-focusing, in general.

The controller 180 may change the position of the lens included in the camera 121 based on at least one of the moving distance and direction of the touch trace 20 [S450].

Figure 19:
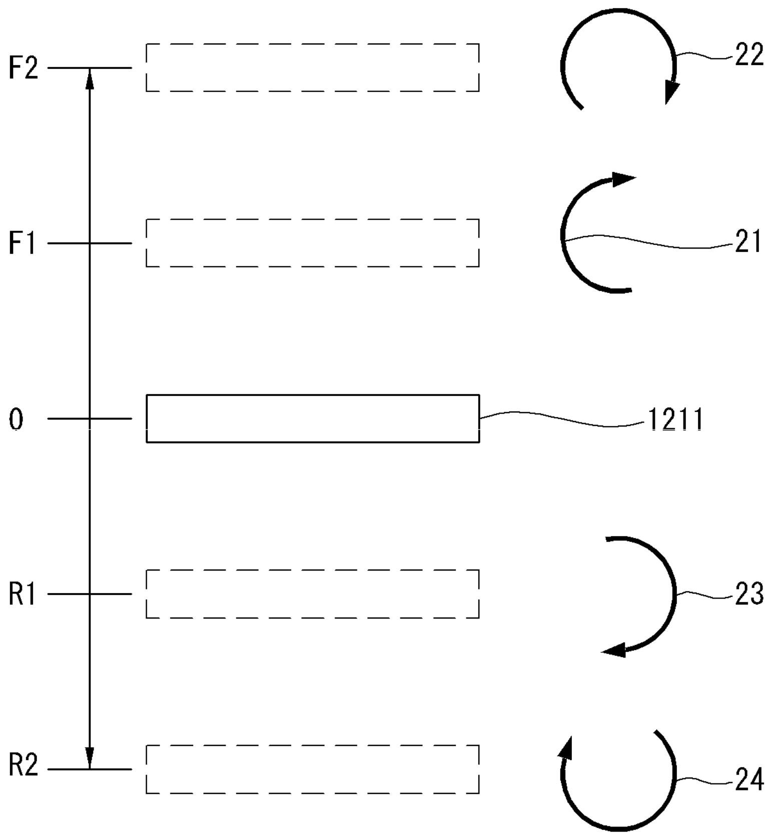

FIG. 19 illustrates an example of changing the position of the lens according to the touch trace.

Referring to FIG. 19, if the position of the lens 1211 when the focusing has completed at S430 corresponds to point 0, the controller 180 may move the lens 1211 to point F1 when the user inputs a first touch trace 21 having a length corresponding to a half circuit clockwise through the touch screen 151.

When the user inputs a second touch tract 22 having a length corresponding to a circle clockwise, the controller

180 may move the lens 1211 to point F2. When the user inputs a third touch trace 23 having a length corresponding to a half circle or a fourth touch tract 24 having a length corresponding to a circle counter clockwise with the lens 1211 located at point 0, the controller 180 may move the lens 1211 to point R1 or R2. The predetermined touch trace is not limited to the forms shown in FIGS. 18 and 19.

Figure 20:
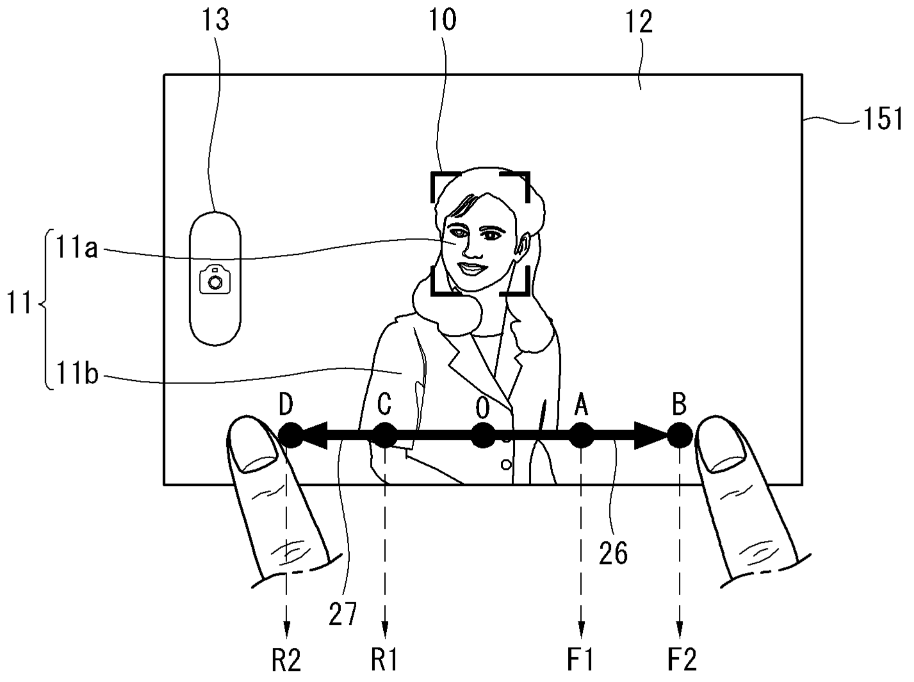

FIG. 20 illustrates another example of changing the position of the lens according to the touch trace.

Referring to FIG. 20, the user may input a fifth touch trace 26 in the form of a straight line starting from point 0 and extending to the right through points A and B. When the fifth touch tract 26 reaches point A, the controller 180 may move the lens 1211 to point F1 of FIG. 19. When the fifth touch tract 26 is arrived at point B, the controller 180 may move the lens 1211 to point F2 of FIG. 19.

The user may input a sixth touch tract 27 in the form of a straight line starting from point 0 and extending to the left through points C and D. The controller 180 may move the lens 1211 to point R1 of FIG. 19 when the sixth touch trace 27 reaches point C and move the lens 1211 to point R2 of FIG. 19 when the sixth touch tract 27 is arrived at point D.

In this manner, the controller 180 can discontinuously adjust the position of the lens. Otherwise, the controller 180 can continuously adjust the position of the lens.

The controller 180 may restrict the lens position adjustment range in consideration of the physical limit of the mobile terminal 100 or the camera 121.

Figure 21:
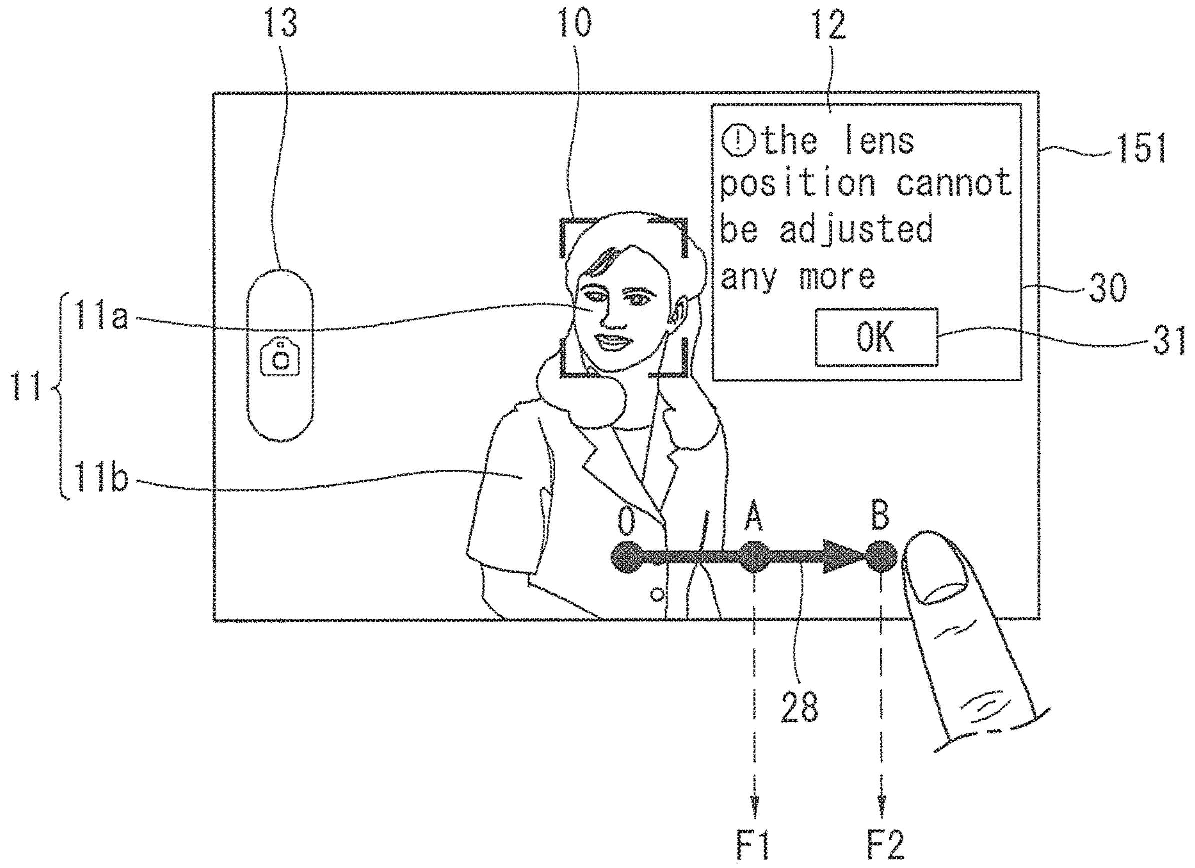

On the assumption that the lens discontinuously moves to the five points 0, F1, F2, R1 and R2, as shown in FIG. 19, when the user inputs a touch trace starting from point 0 and passing through point A corresponding to point F1 and point B corresponding to point F2, as shown in FIG. 21, the controller 180 cannot further move the lens 1211 in response to the touch tract after moving the lens 1211 to point F2. In this case, the controller 180 may provide an information window 30, as shown in FIG. 21, to inform the user that the lens position cannot be adjusted any more.

When the user touches a confirmation button 31 included in the information window 30, the information window 30 may disappear from the touch screen 151.

Furthermore, the controller 180 may output a warning message and/or warning sound, such as a message ("it is beyond adjustment range"), through the audio output unit 152.

The controller 180 may display an indicator or a progress bar that indicates an adjustment degree of the lens location on the touch screen 151 while adjusting the lens position according to input of the touch trace.

Figure 22:
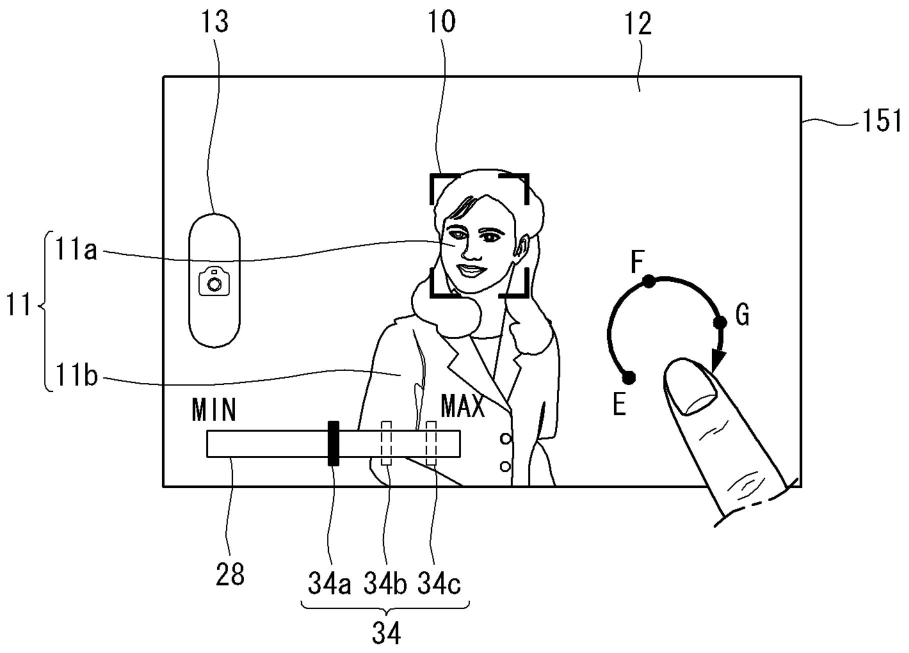

Referring to FIG. 22, the controller 180 can display the indicator 34 or progress bar 33 for indicating a degree to which the lens position is adjusted when the touch trace for adjusting the lens position is input. The indicator 34 indicating the lens position may move on the progress bar 33 in response to the distance and direction of the touch trace. For example, when the user inputs touch trace starting from point E and passing through points F and G, as shown in FIG. 22, the controller 180 can move the indicator 34 to point 34*a* corresponding to point E. In FIG. 22, the indicator 34 may move to point 34*b* when the touch tract reaches point F and the indicator 34 may move to point 34*c* when the touch tract is arrived at point G.

Figure 23:
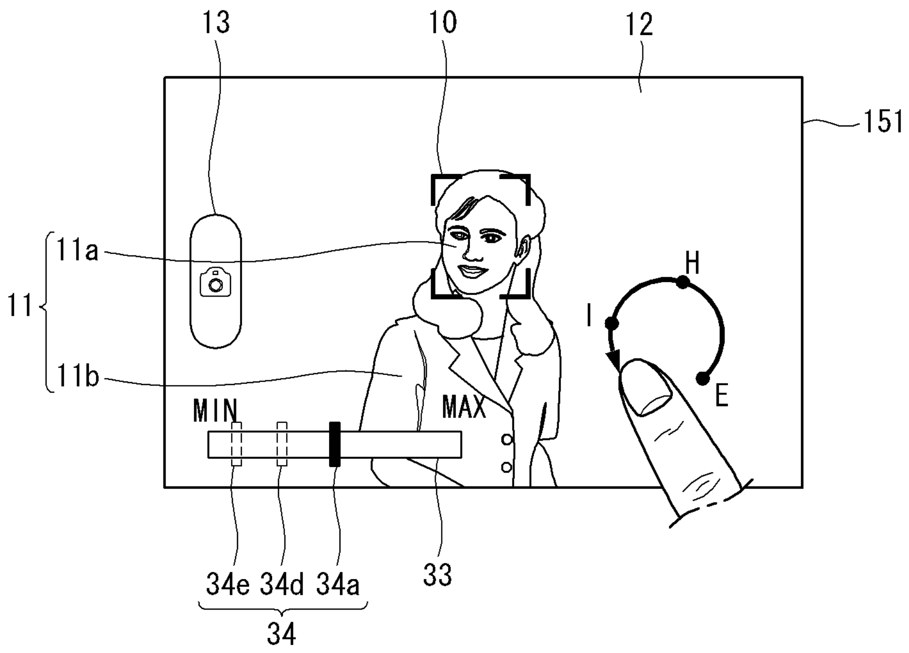

FIG. 23 shows touch trace in a direction opposite to the touch trace shown in FIG. 22 and the indicator 34 and the progress bar 33 according to the touch trace. Referring to FIG. 23, the indicator 34 may move to point 34*d* when the touch tract starts from point E and reaches point H and the indicator 34 may move to point 34*e* when the touch trace reaches point I.

Although the predetermined touch trace is input on the touch screen 151 in this embodiment, the technical spirit of this document is not limited thereto. For example, the touch trace for adjusting the lens position may be configured to be input through the first guide 10.

Furthermore, the controller 180 may return the lens to the original position (the position after the focusing is performed at S430) when receiving a predetermined command.

The controller 180 may perform focusing based on the specific point when the lens position is changed as described above [S460]. Then, the controller 180 may receive an image capturing command [S470] and capture the image according to the image capturing command [S480]. Steps S470 and S480 respectively correspond to steps S350 and S360 in the above embodiment shown in FIG. 9.

Figure 24:
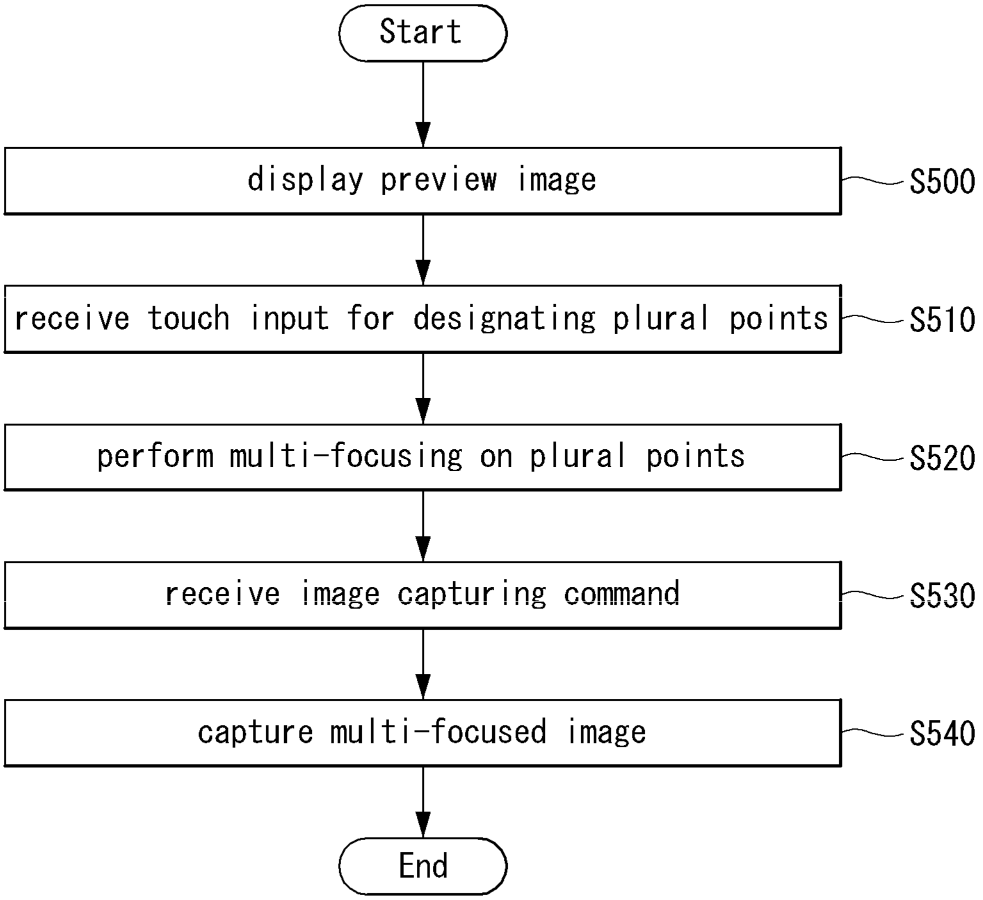
FIG. 24 is a flowchart illustrating image capturing in a mobile terminal according to another embodiment of the present invention.

FIG. 24 is a flowchart illustrating a process of capturing an image in a mobile terminal according to another embodiment of the present invention and FIGS. 25 through 37 are diagrams illustrating the image capturing process shown in FIG. 24.

The image capturing process according to this embodiment may be implemented in the mobile terminal 100 described above with reference to FIGS. 1, 2, 3 and 4. The image capturing process in the mobile terminal 100 and the operation of the mobile terminal 100 to implement the image capturing process will now be explained in detail with reference to the attached drawings.

Referring to FIG. 24, the controller 180 may display a preview image captured through the camera 121 on the touch screen 151 [S500]. Step S500 corresponds to step S300 in the above embodiment shown in FIG. 9.

The controller 180 may receive touch input for designating a plurality of points on the preview image [S510] and perform multi-focusing on the designated points [S520]. Steps S510 and S520 may be executed in various manners, which will be now explained according to various embodiments of the present invention.

Figure 25:
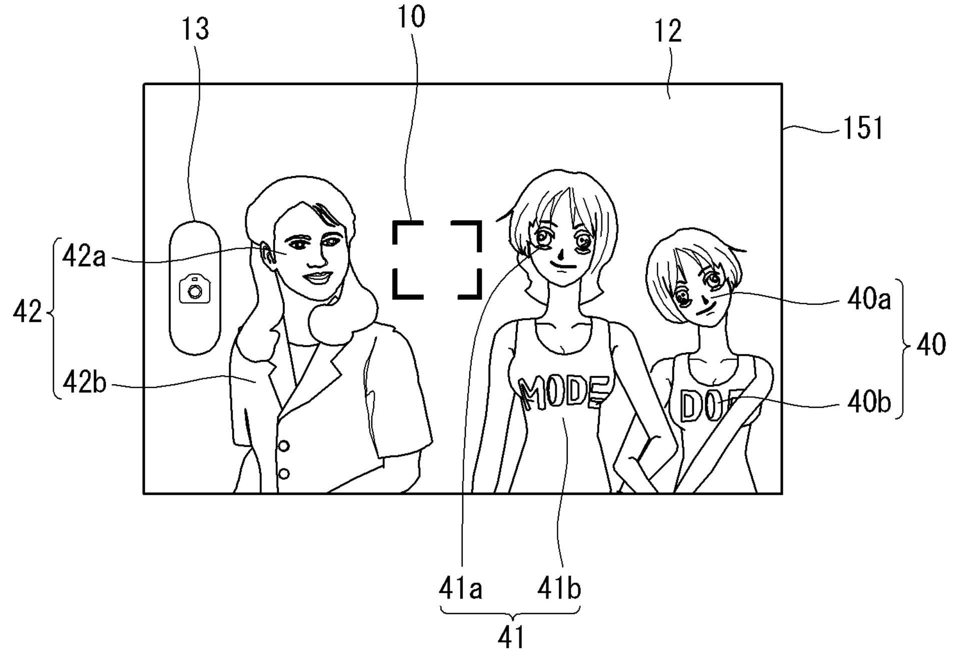
FIGS. 25 to 37 are diagrams illustrating the image capturing process shown in FIG. 24.

Referring to FIG. 25, the controller 180 may display the first guide 10 at a predetermined position (the center of the touch screen 131) when displaying the preview image on the touch screen 151. The preview image shown in FIG. 25 includes three objects 40, 41 and 42. These three objects 40, 41 and 42 are composed of sub objects corresponding to the face and body of a person.

Figure 26:
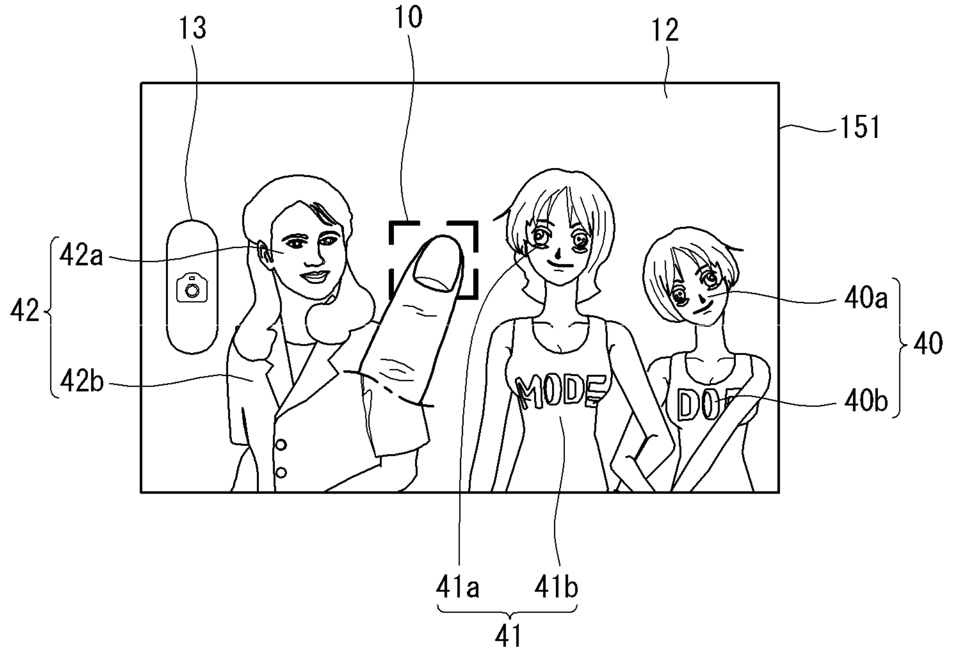
Figure 27:
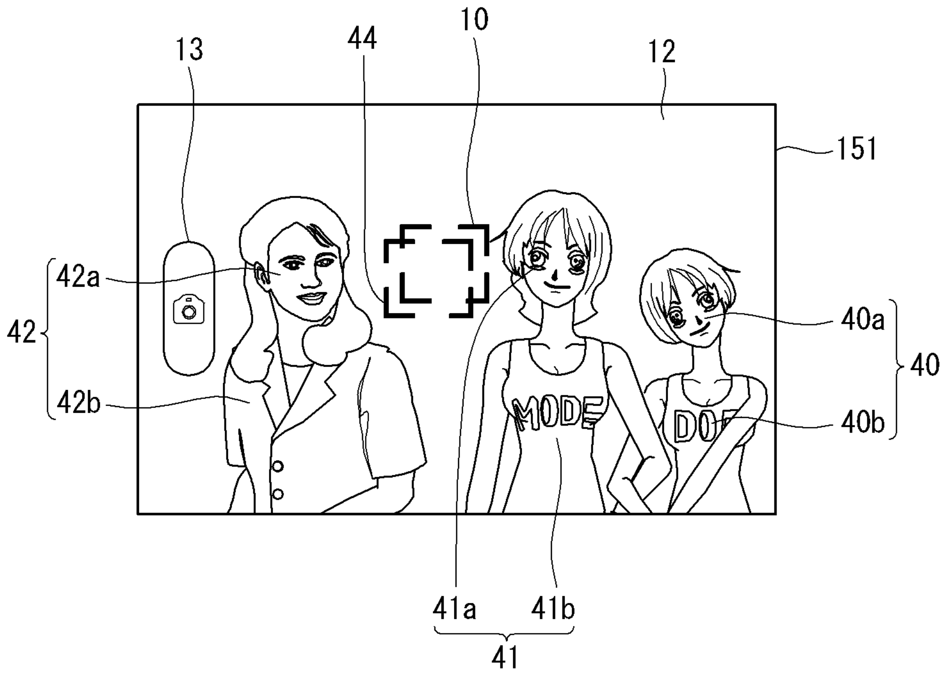

Referring to FIG. 26, the user may touch a point included in the first guide 10. The controller 180 may additionally display a second guide 44 having the same size as the first guide 10, as shown in FIG. 27, when the point in the first guide 10 is touched.

Figure 28:
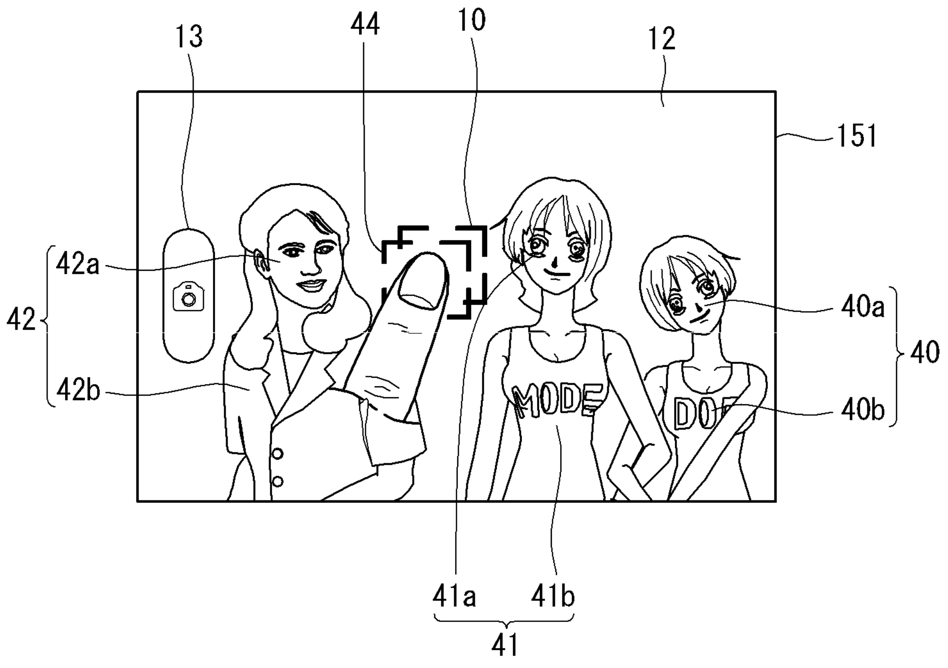
Figure 29:
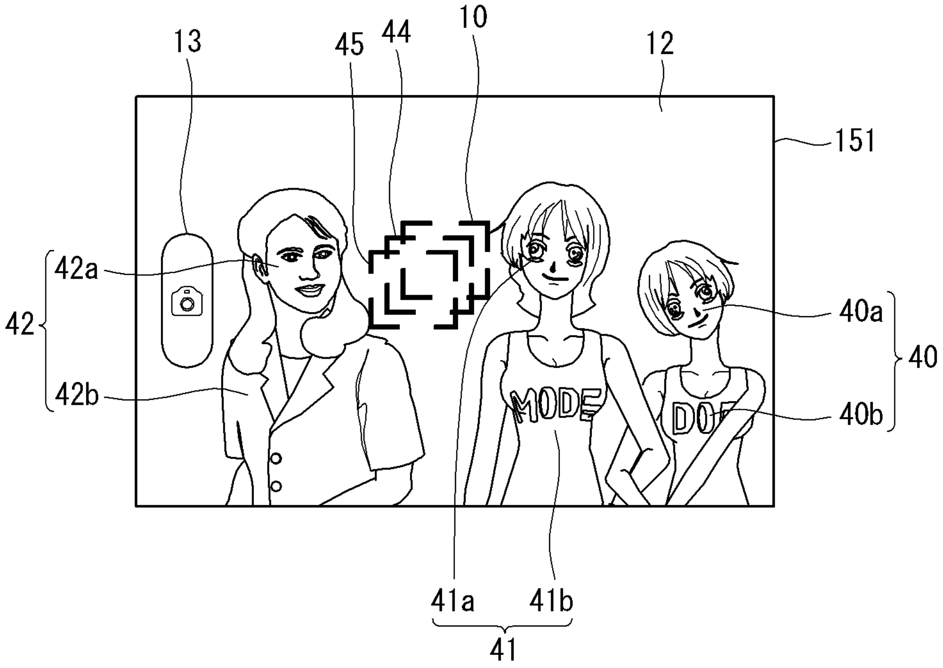

When the user touches a point included in the first guide 10 or the second guide 44, as shown in FIG. 28, the controller 180 may additionally display a third guide 45 having the same size as the first and second guides 10 and 44, as shown in FIG. 29. That is, a guide identical to the first guide 10 may be additionally displayed on the touch screen 151 whenever the user touches the first guide 10. The user may move the first, second and third guides 10, 44 and 45 to desired points.

Figure 30:
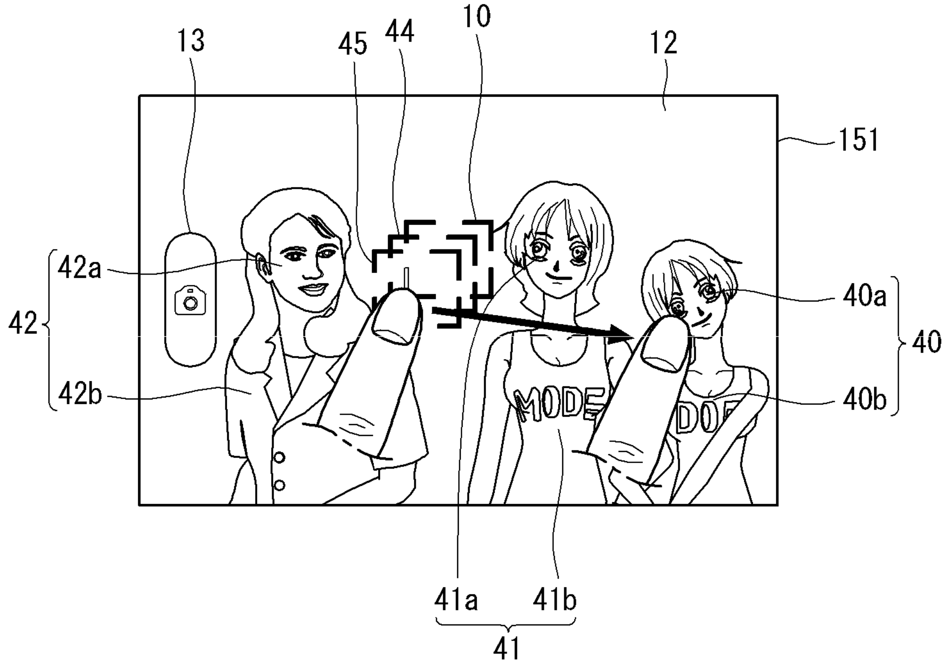
Figure 31:
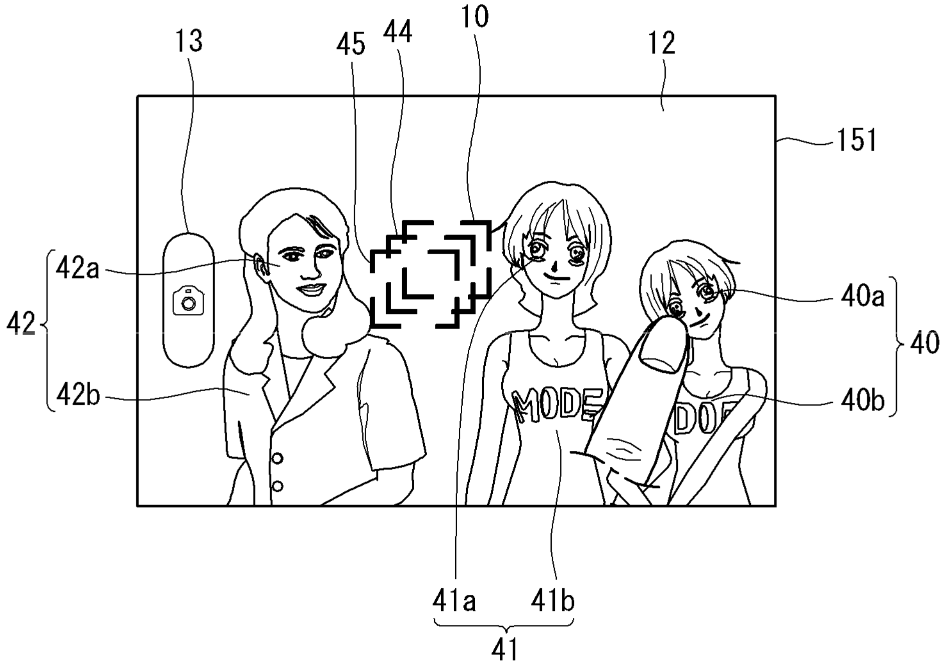

Referring to FIG. 30, the user may drag the third guide 45 to drop the third guide 45 on a face 40*a* included in a third object 40. Referring to FIG. 31, the user may touch the face 40*a* included in the third object 40 with a finger.

Figure 32:
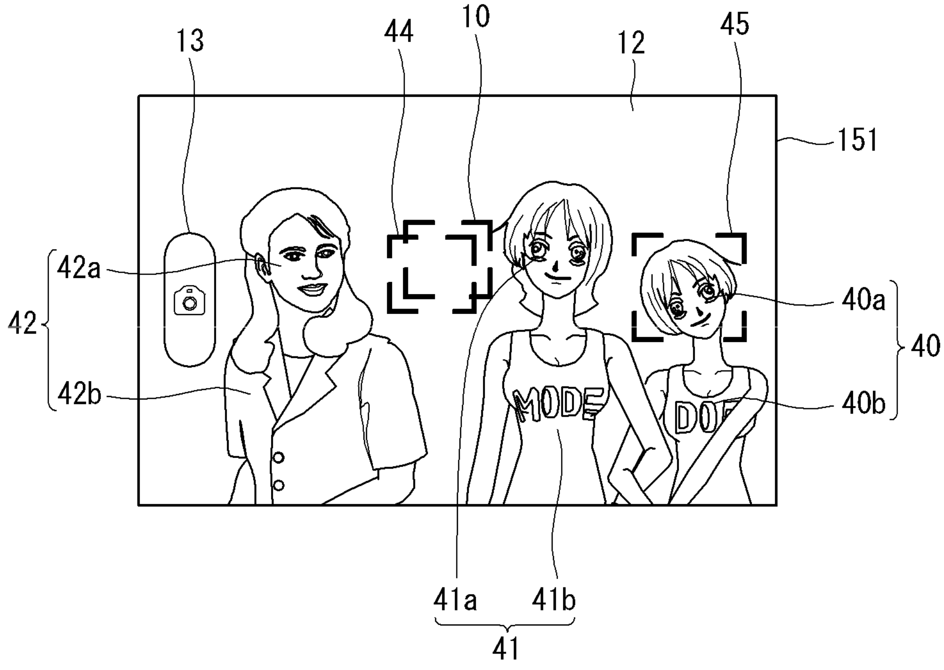

The controller 180 may move the third guide 45 to the face 40*a* and display the third guide 45 thereon, as shown in FIG. 32, according to the drag-and-drop operation shown in FIG. 30 and the touch operation shown in FIG. 31. Here, the aforementioned embodiment shown in FIG. 9 may be applied to the third guide 45. That is, the controller 180 may determine the focusing area for focusing on the face 40*a* while varying the size of the third guide 45.

The controller 180 can receive touch input for designating the faces 40*a*, 41*a* and 42*a* respectively included in the first, second and third objects 40, 41 and 42 from the user according to the above method (refer to FIG. 30 or 31)

Figure 33:
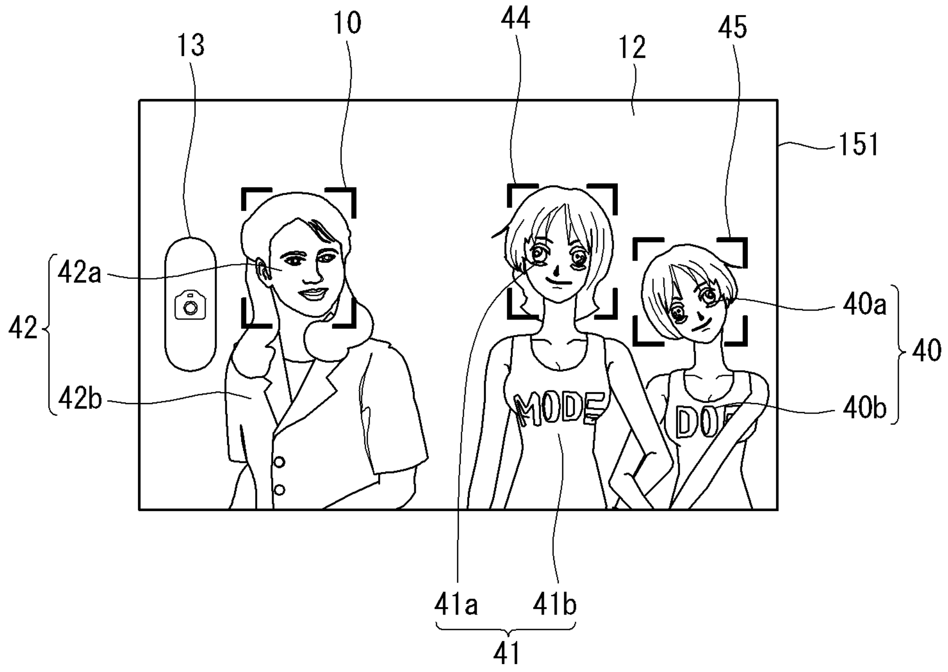

FIG. 33 illustrates an example that the first, second and third guides 10, 44 and 45 are displayed respectively corresponding to the faces 42*a*, 41*a* and 40*a* upon receiving the touch input for designating the faces 40*a*, 41*a* and 42*a*. Here, the controller 180 can determine focusing areas for the faces 40*a*, 41*a* and 42*a*, as described above.

The controller 180 may perform multi-focusing based on the determined focusing areas. The multi-focusing can be sequentially carried out when the focusing areas are determined as the first, second and third guides 10, 44 and 45 are displayed corresponding to the 42*a*, 41*a* and 40*a*. Furthermore, the multi-focusing may be automatically performed when the controller 180 receives a predetermined command signal or a predetermined condition is satisfied.

For example, when the focusing areas for the faces 40*a*, 41*a* and 42*a* are determined, as shown in FIG. 33, the controller 180 can automatically perform the multi-focusing based on the faces 40*a*, 41*a* and 42*a*.

Figure 37:
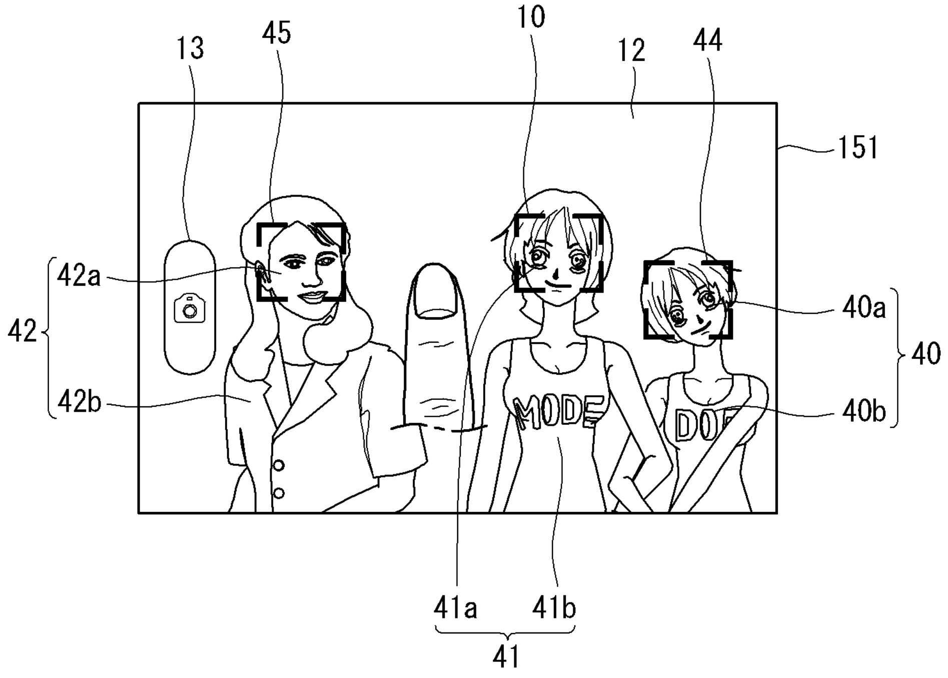

Referring to FIG. 37, when the user touches a point of the touch screen 151 and maintains the touch for a predetermined time (long touch), the controller 180 can perform the multi-focusing based on the faces 40*a*, 41*a* and 42*a*.

The controller 180 can execute steps S510 and S520 in a manner different from the manner explained with reference to FIGS. 25 to 33.

Figure 34:
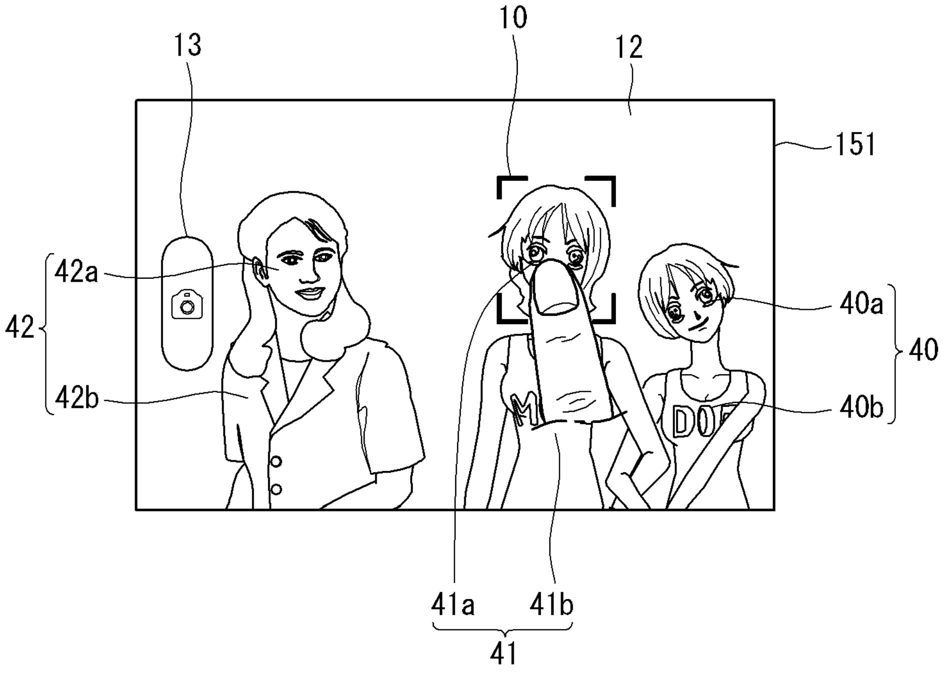

For example, when the user touches the specific object 41*a*, as shown in FIG. 34, the controller 180 can display the first guide 10 such that the first guide 10 corresponds to the touched object 41. Here, the controller 180 can determine the focusing area for focusing on the touched object 41*a* while varying the size of the first guide 10, as described above.

Figure 35:
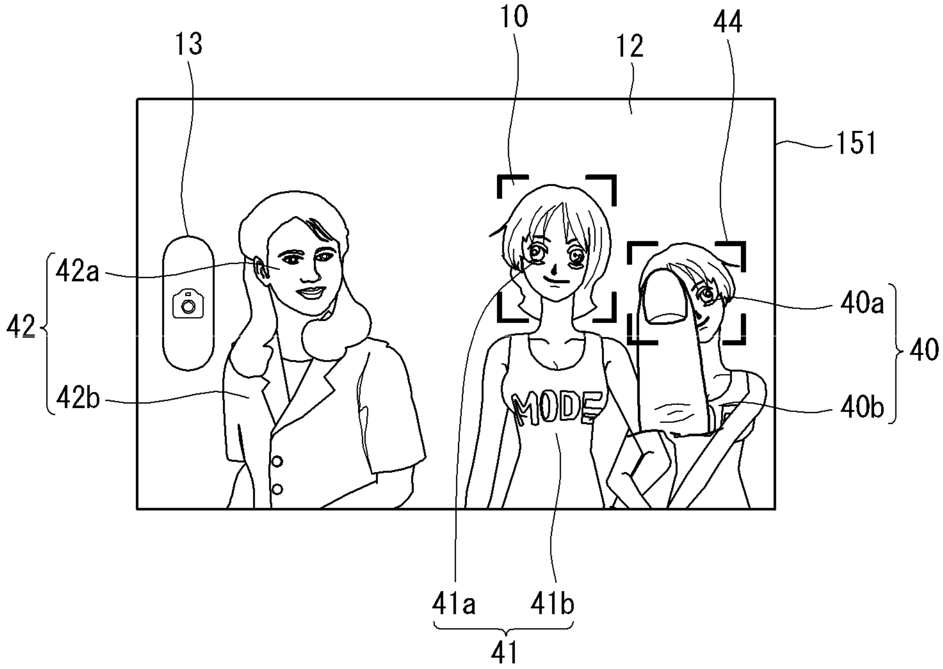

Referring to FIG. 35, when the user touches the object 40*a* while the first guide 10 is displayed corresponding to the object 41*a*, the controller 180 may display the second guide 44 corresponding to the object 40*a*. In this manner, a new AFG can be generated and displayed whenever the user touches an object that the user wants to focus. The controller 180 can determine the focusing area whenever a new AFG is displayed according to the above embodiment shown in FIG. 9.

Figure 36:
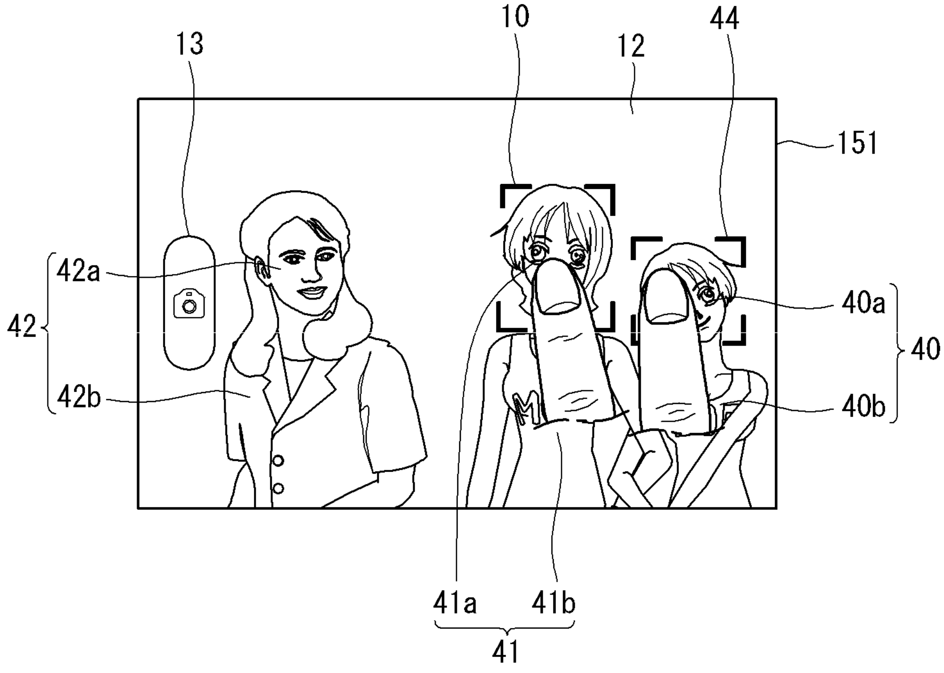

Referring to FIG. 36, when plural objects 40*a* and 41*a* are simultaneously touched (multi-touch), the controller 180 may recognize the multi-touch as touch input for designating the objects 40*a* and 41*a* and perform multi-focusing for the objects 40*a* and 41*a*. The multi-touch may be applied to two, three or more points (which may correspond to objects) if the user can touch the points.

The controller 180 may receive an image capturing command from the user [S530] and capture the image on which the multi-focusing has been performed according to the image capturing command [S540]. Steps S530 and S540 respectively correspond to steps S350 and S360 shown in FIG. 9.

In the multi-focusing in this embodiment of the invention, priority may be given to at least part of plural points based on a predetermined standard and focusing accuracy may depend on the priority. That is, a point having a high priority can be focused with high accuracy. The predetermined standard may include a variety of standards. A method of giving priority based on various standards will now be explained in detail.

The controller 180 may give the priority based on the time when the controller 180 receives the touch input for multi-focusing. For example, the controller 180 can give the highest priority to the face 41*a* corresponding to the first point touched for the multi-focusing, as shown in FIGS. 34 and 35. The controller 180 may perform focusing with the highest accuracy on the face 41*a* when performing the multi-focusing on the faces 40*a*, 41*a* and 42*a*.

In addition, the controller 180 can give a priority lower than that of the face 41*a* and higher than that of the face 42*a* to the face 40*a* and perform the multi-focusing according to the given priorities.

Furthermore, the controller 180 may give the priority based on whether an object corresponding to a specific point among plural points touched for the multi-focusing corresponds to data stored in the memory 160. For example, if the specific face 40*a* among the faces 40*a*, 41*a* and 42*a* shown in FIG. 33 is an object registered in a contact book (for example, phonebook) stored in the memory 160, the controller 180 can give a high priority to the specific face 40*a*. If another specific face 41*a* is registered as a friend according to a Social Network Service (SNS) application or corresponds to a person with whom the user of the mobile terminal 100 exchanged data through the application, the controller 180 can give a high priority to the specific face 41*a*.

Moreover, the controller 180 may give the priority based on whether a specific point among plural points corresponds to an area having a large number of objects classified as a specific type. For example, when many people gather in an area corresponding to a specific point among the plural points designated for the multi-focusing, the controller 180 can give a higher priority to that point.

In addition, the controller 180 may give the priority based on the sizes of AFGs respectively corresponding to the plural points. Referring to FIG. 33, the first guide 10 has the largest size (that is, the largest focusing area is determined for the first guide 10), and thus the controller 180 can give the highest priority to the face 42*a* corresponding to the first guide 10.

Meantime, it may be required to change a specific point for focusing because the user changes his/her mind or makes a mistake while plural guides (for example, the first, second and third guides 10, 44 and 45 shown in FIG. 33) are displayed.

To prepare for this case, the controller 180 may display a soft key (not shown) for resetting on the touch screen 151. For example, when the user touches the reset soft key in the state shown in FIG. 33, all the first, second and third guides 10, 44 and 45 disappear and the process returns to the stage before the multi-focusing is performed.

Furthermore, when the user touches a specific guide among the first, second and third guides 10, 44 and 45 in the state shown in FIG. 33, the controller 180 may delete the touched guide from the touch screen 151 and cancel focusing for the touched guide. That is, display and deletion of a specific guide can be repeated whenever the user touches the specific guide in a toggle manner.

The above-described embodiments can be applied to a case that a panorama image including plural images is photographed.

Figure 38:
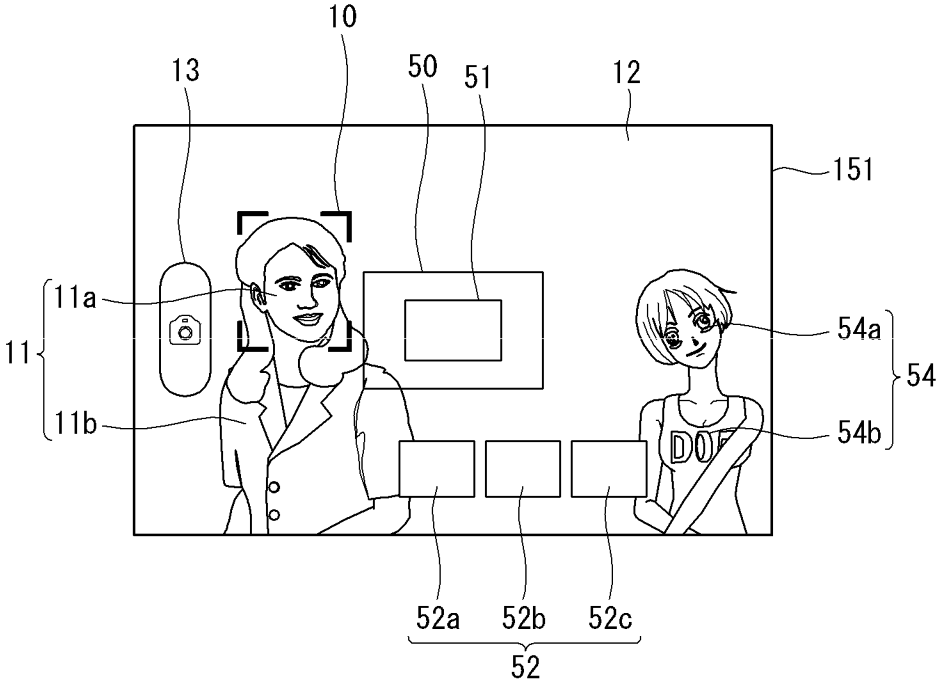
FIGS. 38, 39 and 40 are diagrams illustrating an example to which embodiments of the present invention are applied when a panorama image is photographed.
Figure 39:
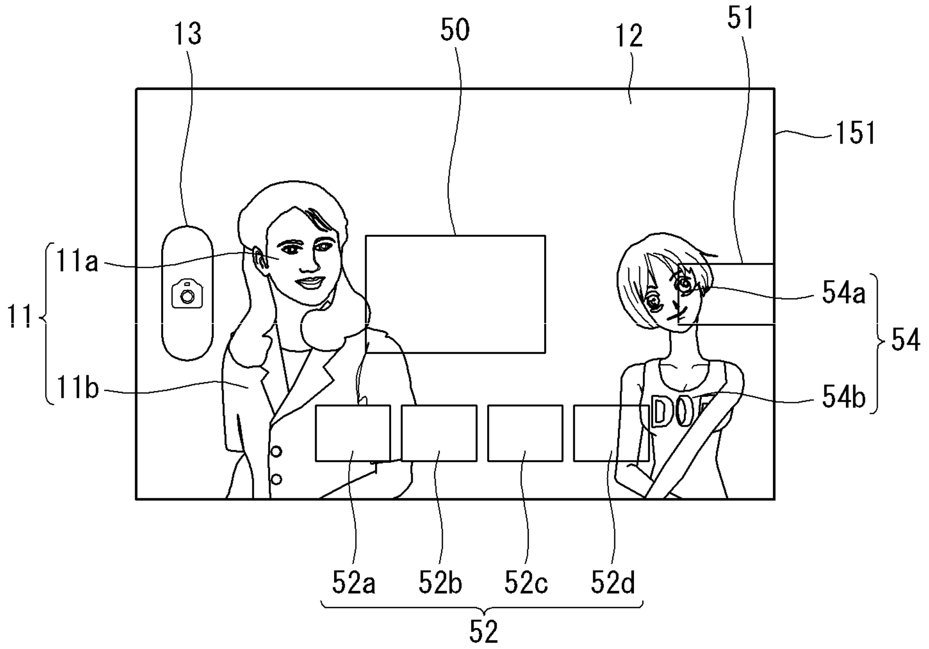
Figure 40:
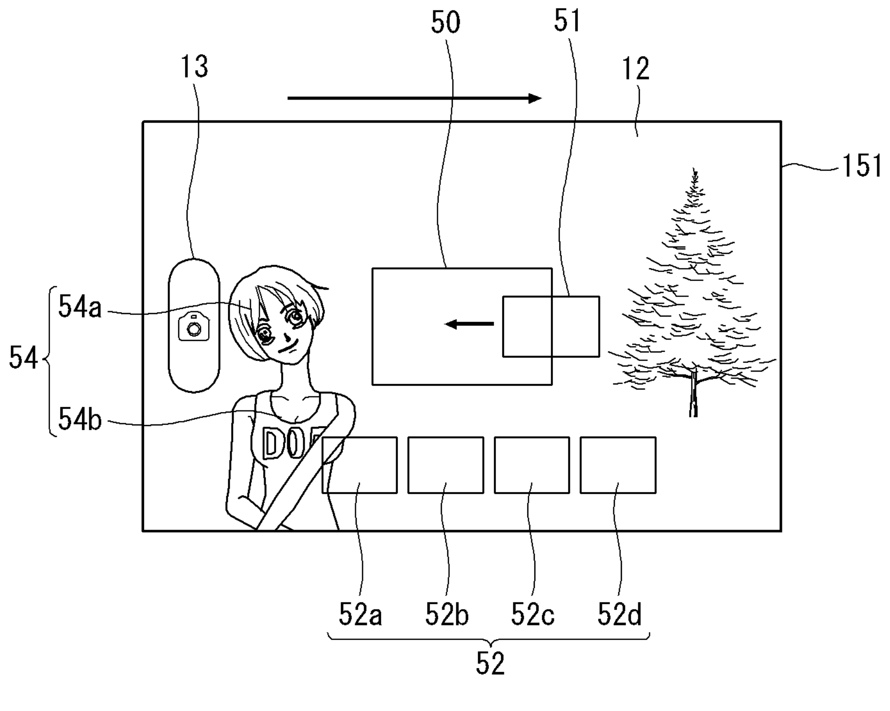

FIGS. 38, 39 and 40 are diagrams illustrating an example to which the above-described embodiments of the invention are applied when a panorama image is photographed.

Referring to FIG. 38, when the mobile terminal 100 enters a mode of photographing a panorama image including plural images through the camera 121, the controller 180 may display a fixed guide 50 on a predetermined position on preview images respectively corresponding to the plural images and display a moving guide 51 moving with the movement of the mobile terminal 100 to connect the plural images.

In FIG. 38, reference numeral 52 represents images captured before preview images currently displayed on the touch screen 151 and included in the panorama image. FIG. 38 shows that the panorama image includes three images 52*a*, 52*b* and 52*c*. In addition, a preview image including two objects 11 and 54 is displayed on the touch screen 151 in FIG. 38. The user may touch a specific object 11 a according to the above-describe embodiment of the present invention to focus on the specific object 11*a*. Furthermore, the user may touch a photographing soft key 13 to capture the currently displayed preview image. Upon capturing the currently displayed preview image, the moving guide 51 moves to the right edge of the touch screen 151, as shown in FIG. 39, and the mobile terminal 100 enters a preview image display mode.

As shown in FIG. 39, the panorama image is composed of four images 52*a*, 52*b*, 52*c* and 52*d*, which include the image 52*d* captured in the step shown in FIG. 38. The user may move the mobile terminal 100 to the right, as shown in FIG. 40, in order to capture the next image to construct the panorama image, that is, the next image following the image 52*d* captured in the step shown in FIG. 38.

The moving guide 51 moves to the fixed guide 50 as the mobile terminal 100 moves to the right, as shown in FIG. 40. The user can capture images constructing the panorama image using the fixed guide 50 and the moving guide 51 so as to connect the images seamlessly.

As described above, the aforementioned embodiments can be applied to capturing images constructing a panorama image.

The above-described image capturing method in a mobile terminal equipped with a touch screen according to the present invention may be recorded in computer-readable recording media as a program for being executed in computers. The image capturing method in the mobile terminal equipped with the touch screen according to the present invention may be executed through software. When the image capturing is executed through the software, the constituting means of the present invention are code segments executing a necessary task. Programs or code segments may be stored in processor-readable media or transmitted through computer data signals combined with carriers over transmission media or a communication network.

Computer-readable recording media include all kinds of recording devices in which data capable of being read by a computer system is stored. For example, the computer-readable recording media may include ROM, RAM, CD-ROM, DVD-ROM, DVD-RAM, magnetic tapes, floppy disks, hard disks, and optical data storages. The computer-readable recording media may also be stored and executed as codes, which are distributed into computer apparatuses connected over a network and readable by computers in a distributed manner.

According to the inventive mobile terminal including the touch screen and the method of capturing images using the same, focusing can be performed on any object which is present at a specific position on a preview image to be captured by a simple touch input action. The position to be focused may be changed easily through a simple touch input method without the need for searching a menu or manipulating a key button, thereby facilitating user convenience.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A mobile terminal comprising:

a camera;

a touch screen; and a controller configured to:

control the touch screen to display preview images received via the camera;

control the touch screen to display an auto focus guide at a specific point of the touch screen in response to a first touch input to the specific point and while the touch screen continues displaying the preview images;

focus the preview images based on a location on the touch screen of the auto focus guide;

determine an image capturing setting of the camera responsive to an object dragged along the touch screen, wherein a value of the image capturing setting is increased responsive to the object being dragged in a first direction and is decreased responsive to the object being dragged in a second direction;

control the touch screen to further respond to the first touch input by displaying an indicator for indicating a current value of the image capturing setting while the displayed auto focus guide is maintained as displayed with a constant size and shape at the specific point while the indicator changes to track changes in the current value of the image capturing setting responsive to continued dragging of the object along the touch screen in the first or second direction; and capture an image according to the current value of the image capturing setting displayed by the indicator when an image capturing command from the user is received.

2. The mobile terminal of claim 1, wherein the controller is further configured to control the touch screen to further respond to the first touch input by initiating display of the indicator for indicating the current value of the image capturing setting while the displayed auto focus guide is maintained as displayed with the constant size and shape at the specific point while the indicator changes to track changes in the current value of the image capturing setting responsive to continued dragging of the object along the touch screen in the first or second direction.

3. The mobile terminal of claim 1, wherein the image capturing setting comprises a focus adjustment setting.

4. The mobile terminal of claim 1, wherein the camera comprises a lens, and wherein determining the image capturing setting comprises adjusting a position of the lens.

5. The mobile terminal of claim 4, wherein the controller is configured to adjust the position of the lens based on a moving distance of the object dragged along the touch screen.

6. The mobile terminal of claim 4, wherein the controller is configured to adjust the position of the lens based on a moving direction of the object dragged along the touch screen.

7. The mobile terminal of claim 4, wherein the controller is configured to adjust the position of the lens discontinuously among a plurality of lens positions.

8. The mobile terminal of claim 4, wherein the controller is configured to adjust the position of the lens continuously.

9. The mobile terminal of claim 1, wherein the first direction comprises a clockwise direction.

10. The mobile terminal of claim 1, wherein the second direction comprises a counterclockwise direction.

11. The mobile terminal of claim 1, wherein the first direction comprises a direction extending to a right side of the touch screen.

12. The mobile terminal of claim 1, wherein the second direction comprises a direction extending to a left side of the touch screen.

13. The mobile terminal of claim 1, wherein the indicator comprises a progress bar.

14. The mobile terminal of claim 13, wherein the controller is configured to control the touch screen to move the indicator along the progress bar responsive to continued dragging of the object along the touch screen.

15. The mobile terminal of claim 1, wherein the controller is configured to restrict an adjustment range of the image capturing setting.

16. The mobile terminal of claim 15, wherein the controller is configured to control the touch screen to display an information window responsive to the image capturing setting reaching a limit of the adjustment range.

17. The mobile terminal of claim 16, wherein the information window comprises a confirmation button.

18. The mobile terminal of claim 15, wherein the controller is configured to output at least one of a warning message or a warning sound responsive to the image capturing setting reaching a limit of the adjustment range.

19. The mobile terminal of claim 1, wherein the image capturing command comprises release of a contact touch input applied to the touch screen.

20. The mobile terminal of claim 1, wherein the controller is configured to control the touch screen to display an icon for inputting the image capturing command.

* * * * *